(12) United States Patent
Larimer et al.

(10) Patent No.: US 12,018,174 B2
(45) Date of Patent: Jun. 25, 2024

(54) COATED SUBSTRATES AND METHODS OF PREPARING THE SAME

(71) Applicant: PPG Industries Ohio, Inc., Cleveland, OH (US)

(72) Inventors: Troy James Larimer, North Huntingdon, PA (US); John R. Schneider, Allison Park, PA (US); Anthony M. Chasser, Greensburg, PA (US); Brian Edward Woodworth, Glenshaw, PA (US); Justin Jonathan Martin, Irwin, PA (US); Steven Joseph Lemon, Lower Burrell, PA (US); Craig Daniel Niederst, Valencia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 58 days.

(21) Appl. No.: 17/271,303

(22) PCT Filed: Aug. 27, 2019

(86) PCT No.: PCT/US2019/048345
§ 371 (c)(1),
(2) Date: Feb. 25, 2021

(87) PCT Pub. No.: WO2020/046937
PCT Pub. Date: Mar. 5, 2020

(65) Prior Publication Data
US 2021/0324203 A1 Oct. 21, 2021

Related U.S. Application Data

(63) Continuation of application No. 16/113,307, filed on Aug. 27, 2018, now abandoned.

(51) Int. Cl.
| | |
|---|---|
| B05D 3/00 | (2006.01) |
| B05D 1/00 | (2006.01) |
| B05D 1/06 | (2006.01) |
| B05D 1/12 | (2006.01) |
| B05D 3/10 | (2006.01) |
| C09D 5/03 | (2006.01) |
| C09D 5/08 | (2006.01) |
| C09D 175/06 | (2006.01) |

(52) U.S. Cl.
CPC ............. *C09D 5/03* (2013.01); *B05D 1/06* (2013.01); *B05D 3/002* (2013.01); *B05D 3/005* (2013.01); *B05D 3/10* (2013.01); *C09D 5/08* (2013.01); *C09D 175/06* (2013.01); *B05D 1/007* (2013.01); *B05D 1/12* (2013.01); *B05D 3/102* (2013.01)

(58) Field of Classification Search
CPC .......... B05D 1/06; B05D 3/002; B05D 3/005; B05D 3/102; B05D 7/14; B05D 7/148; B05D 7/20; B05D 7/50; B05D 7/52; B05D 7/56

See application file for complete search history.

(56) References Cited

U.S. PATENT DOCUMENTS

| | | |
|---|---|---|
| 3,455,806 A | 7/1969 | Spoor et al. |
| 3,793,278 A | 2/1974 | Bona |
| 3,928,157 A | 12/1975 | Suematsu et al. |
| 3,937,679 A | 2/1976 | Bosso et al. |
| 3,947,338 A | 3/1976 | Jerabek et al. |
| 3,962,165 A | 6/1976 | Bosso et al. |
| 3,975,346 A | 8/1976 | Bosso et al. |
| 3,984,229 A | 10/1976 | Gorling |
| 4,001,156 A | 1/1977 | Bosso et al. |
| 4,031,050 A | 6/1977 | Jerabek |
| 4,104,147 A | 8/1978 | Marchetti et al. |
| 4,332,711 A | 6/1982 | Kooymans et al. |
| 4,432,850 A | 2/1984 | Moriarity et al. |
| 4,452,963 A | 6/1984 | Moriarity |
| 4,812,215 A | 3/1989 | Karabin et al. |
| 4,865,705 A | 9/1989 | Hendrikx et al. |
| 5,573,812 A | 11/1996 | Moy |
| 5,578,345 A | 11/1996 | Moy |
| 5,922,413 A * | 7/1999 | Takeda ............... B05D 7/14 427/104 |
| 6,017,432 A | 1/2000 | Boyd et al. |
| 6,165,338 A | 12/2000 | December et al. |
| 6,692,817 B1 * | 2/2004 | Silva ................. B29C 70/30 425/389 |
| 7,618,677 B2 * | 11/2009 | Roelofs ............... B05D 7/57 427/195 |
| 7,736,730 B2 | 6/2010 | Jung et al. |
| 8,884,059 B2 | 11/2014 | Zawacky et al. |

(Continued)

FOREIGN PATENT DOCUMENTS

| | | |
|---|---|---|
| EP | 12463 B1 | 6/1982 |
| EP | 3293287 A1 | 3/2018 |

(Continued)

OTHER PUBLICATIONS

Bakhtiary-Noodeh et al., "Improvement of the edge protection of an automotive electrocoating in presence of a prepared epozy-amin microgel", Process in Organic Coatings, 2017, pp. 111-125, vol. 103.

(Continued)

*Primary Examiner* — Michael P Wieczorek
(74) *Attorney, Agent, or Firm* — Krisanne Shideler

(57) ABSTRACT

The present invention relates to a substrate having (a) a first material applied to at least a portion of the substrate, and (b) a coating layer deposited from a powder coating composition including a film-forming resin, and optionally a cross-linker that is reactive with the film-forming resin, in direct contact with at least a portion of the substrate to which the first material has been applied. The first material is (i) a catalyst that catalyzes cure of the powder coating composition, (ii) a component reactive with the film-forming resin and/or the crosslinker of the powder coating composition, and/or (iii) a rheology modifier.

29 Claims, No Drawings

(56) References Cited

U.S. PATENT DOCUMENTS

| | | |
|---|---|---|
| 9,030,807 B2 | 5/2015 | Chacko et al. |
| 9,051,475 B2 | 6/2015 | Silvernail et al. |
| 9,181,628 B2 | 11/2015 | Valko et al. |
| 9,598,530 B2 | 3/2017 | Gros et al. |
| 9,751,107 B2 | 9/2017 | Decker et al. |
| 10,125,424 B2 | 11/2018 | Sudour et al. |
| 2003/0054193 A1 | 3/2003 | McCollum et al. |
| 2003/0232141 A1* | 12/2003 | Wursthorn ........... C09D 179/02 427/299 |
| 2004/0191555 A1 | 9/2004 | Germano |
| 2005/0061655 A1 | 3/2005 | Gros et al. |
| 2006/0001011 A1* | 1/2006 | Wilson ................ C09D 7/20 427/299 |
| 2007/0057760 A1 | 3/2007 | Wang |
| 2009/0032144 A1 | 2/2009 | McMillen et al. |
| 2009/0045071 A1 | 2/2009 | Valko et al. |
| 2010/0176000 A1 | 7/2010 | Inbe et al. |
| 2011/0177346 A1 | 7/2011 | Silvernail et al. |
| 2013/0108785 A1* | 5/2013 | Okamoto ............ F16F 1/024 427/180 |
| 2014/0255608 A1 | 9/2014 | Eibon et al. |
| 2014/0356617 A1 | 12/2014 | Silvernail et al. |
| 2015/0044476 A1 | 2/2015 | Decker et al. |
| 2016/0244884 A1 | 8/2016 | Kudo et al. |
| 2021/0332251 A1 | 10/2021 | Larimer et al. |

FOREIGN PATENT DOCUMENTS

| | | |
|---|---|---|
| EP | 2067882 B1 | 4/2018 |
| JP | 201981162 A | 5/2019 |
| WO | 2000/068459 A1 | 11/2000 |
| WO | 0146495 A2 | 6/2001 |
| WO | 2004/067190 A2 | 8/2004 |
| WO | 2008076654 A1 | 6/2008 |
| WO | 2009/131234 A1 | 10/2009 |

OTHER PUBLICATIONS

Bakhtiary-Noodeh et al., "Edge protection improvement of automotive electrocoatings in the presence of silica nanoparticles", Surface & Coatings Technology, 2017, pp. 134-147, vol. 317.

* cited by examiner

COATED SUBSTRATES AND METHODS OF PREPARING THE SAME

FIELD OF THE INVENTION

The present invention relates to substrates and methods for treating substrates, sealing surfaces of substrates, decreasing sag resistance, improving adhesion, and improving edge coverage.

BACKGROUND OF THE INVENTION

Coatings are applied to substrates to provide numerous properties including protective properties, decorative properties, and the like. Typically, these coatings are applied across the entire surface of the substrates including the edges and corners. However, the compositions that form these coatings often flow over the edges and corners resulting in low film build around these areas. As a result, the coatings pull away from the edges and corners of the substrates, so the properties provided by these coatings are not obtained or are diminished at the edges and corners. Thus, it is desirable to provide coated substrates with improved coating coverage over the edges and corners.

SUMMARY OF THE INVENTION

The present invention relates to a substrate comprising: (a) a first material applied to at least a portion of the substrate; and (b) a coating layer deposited from a powder coating composition comprising a film-forming resin, and optionally a crosslinker that is reactive with the film-forming resin, in direct contact with at least a portion of the substrate to which the first material has been applied, in which the first material is (i) a catalyst that catalyzes cure of the powder coating composition, (ii) a component reactive with the film-forming resin and/or the crosslinker of the powder coating composition, and/or (iii) a rheology modifier.

Moreover, the present invention relates to a method for treating a substrate, sealing a surface of a substrate, decreasing sag resistance, improving adhesion, and/or improving edge coverage comprising: (a) contacting at least a portion of the substrate with a first material; (b) directly contacting at least a portion of the substrate in contact with the first material with a powder coating composition comprising a film forming resin and optionally a crosslinker that is reactive with the film forming resin; and (c) liquidizing the powder coating composition to form a coating layer of the powder coating composition on the substrate, in which the first material is (i) a catalyst that catalyzes cure of the powder coating composition, (ii) a component reactive with the film-forming resin and/or the crosslinker of the powder coating composition, and/or (iii) a rheology modifier.

The present invention also relates to a method of treating a coil comprising: (a) contacting at least a portion of the coil with a first material; (b) rolling the coil; (c) unrolling the coil at later period of time; (d) directly contacting at least a portion of the coil in contact with the first material with a powder coating composition comprising a film forming resin and optionally a crosslinker that is reactive with the film forming resin; and (e) liquidizing the powder coating composition to form a coating layer of the powder coating composition on the coil, in which the first material is (i) a catalyst that catalyzes cure of the powder coating composition, (ii) a component reactive with the film-forming resin and/or the crosslinker of the powder coating composition, and/or (iii) a rheology modifier.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" first material, "a" coating composition, and the like refer to one or more of any of these items.

As previously described, the present invention relates to a substrate comprising: (a) a first material applied to at least a portion of the substrate; and (b) a coating layer deposited from a powder coating composition comprising a film-forming resin, and optionally a crosslinker reactive with the film-forming resin, that is in direct contact with at least a portion of the substrate to which the first material has been applied. That is, the powder coating composition is applied directly to at least a portion of the substrate to which the first material is applied before application of any other intermediate layers. As used herein, a "powder coating composition" refers to a coating composition embodied in solid particulate form as opposed to liquid form.

It is appreciated that the coating layer deposited from the powder coating composition is formed after liquidizing (i.e., melting) the powder coating composition on the substrate to which the first material has been applied. In accordance with the present invention, the interfacial flow of the liquidized powder coating composition in contact with at least a portion of the substrate to which the first material has been applied is lower than the interfacial flow of the same powder composition liquidized under the same conditions that is in contact with an identical substrate with the exception that no first material has been applied or with a portion of the same substrate to which the first material has not been applied. The "interfacial flow" refers to the flow of the liquidized powder coating composition at an interface of the first material and the liquidized powder coating composition. The viscosity of the liquidized powder coating composition can also be higher than the viscosity of the same powder coating composition liquidized under the same conditions without contact to the first material.

The first material of the present invention can be selected to interact with the desired powder coating composition. The powder coating composition is typically a curable powder coating composition that comprises a binder. As used herein, the terms "curable", "cure", and the like, as used in connection with a powder coating composition, means that at least a portion of the components that make up the powder coating composition are polymerizable and/or crosslinkable including self-crosslinkable polymers.

The curable powder coating composition of the present invention can be cured with heat, increased or reduced pressure, chemically such as with moisture, or with other means such as actinic radiation, and combinations thereof. The term "actinic radiation" refers to electromagnetic radiation that can initiate chemical reactions. Actinic radiation includes, but is not limited to, visible light, ultraviolet (UV) light, infrared radiation, X-ray, and gamma radiation.

Further, a "binder" refers to a constituent material that typically holds all coating composition components together upon cure. The binder comprises one or more film-forming resins that can be used to form the coating layer. As used herein, a "film-forming resin" refers to a resin that can form a self-supporting continuous film on at least a horizontal surface of a substrate upon removal of any diluents or carriers present in the composition and/or upon curing. The term "resin" is used interchangeably with "polymer," and the term polymer refers to oligomers, homopolymers (e.g., prepared from a single monomer species), copolymers (e.g., prepared from at least two monomer species), terpolymers (e.g., prepared from at least three monomer species), and graft polymers.

The powder coating compositions used with the present invention can include any of a variety of thermosetting powder coating compositions known in the art. As used herein, the term "thermosetting" refers to compositions that "set" irreversibly upon curing or crosslinking, wherein polymer chains of polymeric components are joined together by covalent bonds. This property is usually associated with a cross-linking reaction of the composition constituents often induced, for example, by heat or radiation. Once cured, a thermosetting resin will not melt upon the application of heat and is insoluble in solvents.

The powder coating compositions used with the present invention can also include thermoplastic powder coating compositions. As used herein, the term "thermoplastic" refers to compositions that include polymeric components that are not joined by covalent bonds and, thereby, can undergo liquid flow upon heating.

Non-limiting examples of suitable film-forming resins that form at least a portion of the binder of the powder coating composition include (meth)acrylate resins, polyurethanes, polyesters, polyamides, polyethers, polysiloxanes, epoxy resins, vinyl resins, copolymers thereof, and combinations thereof. As used herein, "(meth)acrylate" and like terms refers both to the acrylate and the corresponding methacrylate. Further, the film-forming resins can have any of a variety of functional groups including, but not limited to, carboxylic acid groups, amine groups, epoxide groups, hydroxyl groups, thiol groups, carbamate groups, amide groups, urea groups, isocyanate groups (including blocked isocyanate groups), ethylenically unsaturated groups, and combinations thereof. As used herein, "ethylenically unsaturated" refers to a group having at least one carbon-carbon double bond. Non-limiting examples of ethylenically unsaturated groups include, but are not limited to, (meth) acrylate groups, vinyl groups, and combinations thereof.

Thermosetting coating compositions typically comprise a crosslinker that may be selected from any of the crosslinkers known in the art to react with the functionality of one or more film-forming resins used in the powder coating composition. As used herein, the term "crosslinker" refers to a molecule comprising two or more functional groups that are reactive with other functional groups and that is capable of linking two or more monomers or polymers through chemical bonds. Alternatively, the film-forming resins that form the binder of the powder coating composition can have functional groups that are reactive with themselves; in this manner, such resins are self-crosslinking.

Non-limiting examples of crosslinkers include phenolic resins, amino resins, epoxy resins, triglycidyl isocyanurate, beta-hydroxy (alkyl) amides, alkylated carbamates, (meth) acrylates, isocyanates, blocked isocyanates, polyacids, anhydrides, organometallic acid-functional materials, polyamines, polyamides, aminoplasts, carbodiimides, oxazolines, and combinations thereof.

The powder coating compositions can also be substantially free, essentially free, or completely free of any of the previously described film-forming resins and/or crosslinkers. For example, the powder coating composition can be substantially free, essentially free, or completely free of a hydroxyl functional film-forming resin and/or an isocyanate functional crosslinker. The term "substantially free" as used in this context means the powder coating composition contains less than 1000 parts per million (ppm), "essentially free" means less than 100 ppm, and "completely free" means less than 20 parts per billion (ppb) of a certain film-forming resin and/or crosslinker such as a hydroxyl functional film-forming resin and/or an isocyanate functional crosslinker, based on the total weight of the powder coating composition.

The powder coating composition can also include other optional materials. For example, the powder coating compositions can also comprise a colorant. As used herein, "colorant" refers to any substance that imparts color and/or other opacity and/or other visual effect to the composition. The colorant can be added to the coating in any suitable form, such as discrete particles, dispersions, solutions, and/or flakes. A single colorant or a mixture of two or more colorants can be used in the coatings of the present invention.

Example colorants include pigments (organic or inorganic), dyes and tints, such as those used in the paint industry and/or listed in the Dry Color Manufacturers Association (DCMA), as well as special effect compositions. A colorant may include, for example, a finely divided solid powder that is insoluble, but wettable, under the conditions of use. A colorant can be organic or inorganic and can be agglomerated or non-agglomerated. Colorants can be incorporated into the coatings for example by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, diazo, naphthol AS, benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, and mixtures thereof.

Example dyes include, but are not limited to, those that are solvent and/or aqueous based such as phthalo green or blue, iron oxide, bismuth vanadate, anthraquinone, and peryleneand quinacridone.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions Division of Eastman Chemical, Inc.

Other non-limiting examples of components that can be used with the powder coating compositions of the present invention include plasticizers, abrasion resistant particles, fillers including, but not limited to, micas, talc, clays, and inorganic minerals, metal oxides, metal flake, various forms of carbon, anti-oxidants, hindered amine light stabilizers, UV light absorbers and stabilizers, surfactants, flow and surface control agents, thixotropic agents, catalysts, reaction inhibitors, corrosion-inhibitors, and other customary auxiliaries. The powder coating compositions can also be free of any one of the previously described additional components.

After being applied over the substrate to which the first material is applied, the powder coating composition can be physisorbed onto the substrate. As used herein, "physisorbed", "physisorption", and like terms refers to a physical adsorption of a composition or material over the substrate in which the forces involved are intermolecular forces. Alternatively, the powder coating composition can be chemisorbed onto the substrate. As used herein, "chemisorbed", "chemisorption", and like terms refers to a chemical adsorption of a composition or material over the substrate in which chemical or ionic bonds are formed.

As indicated, the first material can be selected to interact with the powder coating composition. As used herein, the term "interact" and variants thereof refer to the ability of the first material to effect or influence any aspect of the powder coating composition including, for example, its cure, physical/chemical properties, performance, appearance, and the like. In accordance with the present invention, the first material is selected from a catalyst that catalyzes cure of the powder coating composition, a component that is reactive with at least one component of the powder coating composition, and/or a rheology modifier that affects the flow of the liquidized powder coating composition over the substrate. The first material may comprise any combination of the first materials selected to interact with the powder coating composition.

As used herein, a "catalyst" refers to a material that increases the rate of reaction of one or more reactive components. Thus, the first material can comprise a catalyst that increases the rate of reaction of the film-forming resin(s) and optional crosslinker(s) that form a binder to thereby catalyze cure of the powder coating composition. The catalyst used as all or part of the first material can therefore be selected based on the components used in the powder coating composition. For example, the binder of the powder coating composition can comprise a carboxylic acid functional compound and an epoxy functional compound reactive with the carboxylic acid functional compound, and the first material can comprise a catalyst comprising a phosphonium compound, a quaternary ammonium halide compound, an amine compound, an imidazole compound, a sulfonium compound, a compound comprising a transition metal and/ or post-transition metal, or any combination thereof that increases the reaction rate between the acid and epoxy functionality.

A "phosphonium compound" refers to a salt comprising a phosphonium cation. Non-limiting examples of phosphonium compounds include tetrabutylphosphonium hydroxide and tetrabutylphosphonium bromide.

A "quaternary ammonium halide compound" refers a salt comprising a quaternary ammonium cation and a halogen anion. Non-limiting examples of quaternary ammonium halide compounds include dodecyltrimethylammonium chloride, benzyltrimethylammonium chloride, benzyl dim ethyl octylammonium chloride, and hexadecyltrimethylammonium bromide.

An "amine compound" refers to a compound comprising one or more primary, secondary, and/or tertiary amines. Non-limiting examples of amine compounds include 1,4-diazabicyclo[2.2.2]octane, 1,8-diazabicyclo[5.4.0]undec-7-ene, coco alkyl amine, benzyl diemethylamine, and 1,1,3, 3-tetramethylguanidine.

An "imidazole compound" refers to a compound comprising a substituted heterocyclic imidazole structure. Non-limiting examples of imidazole compounds include 1-methyl imidazole and 2-methyl imidazole.

A "sulfonium compound" refers to a salt comprising a sulfonium cation. A non-limiting example of a sulfonium compound is trimethylsulfonium iodide.

A "compound comprising a transition metal" refers to a compound comprising an element from one of Groups 3-12 (International Union of Pure and Applied Chemistry (IUPAC)) of the periodic table of the chemical elements, and a "compound comprising post-transition metal" refers to a compound comprising a post-transition metal element from one of Groups 13 and 14 (International Union of Pure and Applied Chemistry (IUPAC)) of the periodic table of the chemical elements. Non-limiting examples of compounds comprising a transition metal include non diammonium dihydroxy bis(lactate(2-)-O1,O2) titanate (2-), and zinc octoate. Non-limiting examples of compounds comprising a post-transition metal include stannous 2-ethylhexoate and tin(II) oxalate.

The first material can comprise a component that is reactive with at least one component of the powder coating composition. For example, the first material can comprise a component that is reactive with a film-forming resin(s) and/or crosslinker(s) used in the binder of the powder coating composition. Non-limiting examples of such reactive components include a crosslinker, a resin such as a film-forming resin, a reactive diluent, a monomer, or any combination thereof.

It is appreciated that the functionality and types of crosslinkers, resins, reactive diluents, and monomers used in the first material are selected to react with the functionality of one or more components of the powder coating composition. Non-limiting examples include any of the resins and crosslinkers previously described provided that the resins or crosslinkers are reactive with the functionality of one or more components of the powder coating composition. For example, the powder coating composition can comprise a carboxylic acid functional film-forming resin and a hydroxyl functional or epoxy functional crosslinker, and the first material can comprise a crosslinker or other component reactive with the carboxylic acid, hydroxyl, and/or epoxy functionality such as, for example, an oxazoline functional crosslinker, a polycarbodiimide functional crosslinker, an isocyanate or blocked isocyanate functional crosslinker, an aminoplast crosslinker, an epoxy crosslinker, a beta-hydroxyalkylamide crosslinker, a hydroxyalkylurea crosslinker, glycoluril, or any combination thereof.

As previously described, the first material can comprise a rheology modifier. As used herein, a "rheology modifier" refers to a component that adjusts flow behavior of a composition by increasing the viscosity of the composition it is in contact with. Particularly, the rheology modifier used in the first material may increase the viscosity and adjust the flow of the liquidized powder coating composition over the substrate. Non-limiting examples of rheology modifiers include silica, chemically modified silica (e.g. fumed silica), alumina, chemically modified alumina (e.g. fumed alumina), a hydrophobically modified ethylene-oxide polymer, a rubber latex such as for example styrene-butadiene rubber particles dispersed in an aqueous liquid medium, or any combination thereof.

The first material, such as a catalyst, reactive component, and/or rheology modifier, can be in solid or liquid form. The first material can also be dispersed or dissolved in an aqueous or non-aqueous liquid medium. The dispersions and solutions can comprise additional components including, but not limited to, surfactants and surfactant solubilizers. It is further appreciated that the powder coating composition can also include a catalyst, reactive component such as a crosslinker, and/or rheology modifier that is different than the catalyst, reactive component, and/or rheology modifier of the first material.

As used herein, a "non-aqueous medium" refers to a liquid medium comprising less than 50 weight % water, based on the total weight of the liquid medium. Such non-aqueous liquid mediums can comprise less than 40 weight % water, or less than 30 weight % water, or less than 20 weight % water, or less than 10 weight % water, or less than 5% water, based on the total weight of the liquid medium. The solvents that make up more than 50 weight % of the liquid medium include organic solvents. Non-limiting examples of suitable organic solvents include polar organic solvents e.g. protic organic solvents such as glycols, glycol ether alcohols, alcohols; and ketones, glycol diethers, esters, and diesters. Other non-limiting examples of organic solvents include aromatic and aliphatic hydrocarbons.

In comparison to a non-aqueous liquid medium, an "aqueous medium" is a liquid medium that comprises greater than 50 weight % water, such as at least 60 weight % water, or at least 70 weight % water, or at least 80 weight % water, or at least 90 weight % water, or at least 95 weight % water, based on the total weight of the liquid medium.

When dispersed or dissolved in a liquid medium, the first material comprises at least 0.05 weight %, at least 0.1 weight %, or at least 1 weight %, based on the total weight of the dispersion or solution. The first material can further comprise up to 20 weight %, up to 15 weight %, up to 10 weight %, up to 8 weight %, up to 5 weight %, or up to 3 weight %, based on the total weight of the dispersion or solution. The first material can also comprise an amount within a range, for example, of from 0.05 weight % to 20 weight %, from 0.05 weight % to 10 weight %, from 0.1 weight % to 8 weight %, or from 0.1 weight % to 5 weight %, based on the total weight of the dispersion or solution.

The first material can be applied directly to the substrate without any intermediate layers between the first material and the substrate. For instance, the first material can be applied directly to a metal substrate, before or after the substrate is cleaned and/or treated as further described herein, but before application of any coating layers. The first material may also be applied during cleaning such as a component of the cleaner. The first material can be applied over the entire surface, edges, and corners of the substrate, or the first material can be applied over selected portions of the substrate. For example, the first material can be selectively applied over the edges and corners of the substrate so that the later applied powder coating composition only interacts with the first material over the edges and corners of the substrate. The first material may also form a continuous or semi-continuous/discontinuous (i.e. non-continuous) layer over the substrate, or the first material may be applied over certain spots/areas of the substrate such as the edges and corners of the substrate. As used herein, the area referred to as the "edge" will vary based on the particular substrate but can include, e.g., the outer most lateral face of the substrate.

Once applied, the first material can be physisorbed onto the substrate in which the first material is physically adsorbed over the substrate through intermolecular forces. Alternatively, the first material is chemisorbed onto the substrate in which the first material is chemically adsorbed over the substrate through valence forces or chemical bonding.

The first material can also be incorporated into a pretreatment composition that is applied over the substrate. As used herein, a "pretreatment composition" refers to a composition that reacts with and chemically alters the substrate surface achieving at least one of the following: 1) formation of a protective layer; 2) improved substrate topography or reactivity to enhance coating adhesion; or 3) formation of a protective layer with improved coating adhesion in comparison to the substrate without pretreatment. Non-limiting examples of pretreatment compositions include compositions that comprise iron phosphate, manganese phosphate, zinc phosphate, a rare earth metal, permanganate or manganese, molybdate or molybdenum, zirconium, titanium, halfnium, lanthanides, a silane such as an alkoxysilane, hydrolyzed silanes and silane oligomers and polymers, metal chelates, trivalent chrome (TCP), silicate, phosphonic acids, chromate conversion coating, hydrotalcite, layered double hydroxide, metal oxides, other metals such as Group IV metals, or any combination thereof. Non-limiting examples of organic pretreatments may include chemically modified resins such as phosphatized epoxies, silanized epoxies and amino functional resins. The pretreatment may also include anodizing using, such as for example, sulfuric acid, nitric acid, hydrofluoric acid, tartaric acid, and other anodizing methods. The pretreatment composition can be in the form of a sol-gel, a liquid, or a solid. In some instances, a pretreatment may contain or be sealed using an oligomeric or polymeric solution or suspension. In yet other instances, a pretreatment composition may contain small organic molecules with reactive functionality or those which function as corrosion inhibitors.

When the pretreatment composition is applied to the substrate and cured or dried, a surface region of the pretreatment layer applied to the substrate can have a greater concentration of the first material than a bulk region of the layer applied to the substrate. For example, the surface tension of the first material can be lower than the surface tension of other components of the pretreatment composition. As a result, the first material migrates to the surface of the pretreatment layer (i.e., moves through the bulk region to the surface region) such that a greater concentration of the first material can be found in the surface region, while the remaining amount of the first material is dispersed throughout the bulk region.

As used herein, the "surface region" means the region that is generally parallel to the exposed air-surface of the coated substrate and which has thickness generally extending perpendicularly from the surface of the cured coating beneath the exposed surface. A "bulk region" of the cured composition means the region which extends beneath the surface region and which is generally parallel to the surface of the coated substrate.

The pretreatment composition that includes the first material can comprise at least 0.05 weight %, at least 0.1 weight %, or at least 1 weight % of the first material, based on the total weight of the pretreatment composition. The pretreatment composition can further comprise up to 20 weight %, up to 15 weight %, up to 10 weight %, up to 8 weight %, up to 5 weight %, or up to 3 weight % of the first material, based on the total weight of the pretreatment composition. The pretreatment composition can also comprise an amount within a range, for example, of from 0.05 weight % to 20 weight %, from 0.05 weight % to 15 weight %, from 0.05 weight % to 10 weight %, from 0.1 weight % to 8 weight %, or from 0.1 weight % to 5 weight % of the first material, based on the total weight of the pretreatment composition.

The first material can also be applied over at least a portion of a substrate that has already had a previous pretreatment and/or coating applied. For example, the first material can be applied to a previously deposited pretreatment layer. Non-limiting examples of pretreatment layers include layers formed from any of the previously described pretreatment compositions. The first material can also be applied over a primer layer or another previously applied coating layer.

The first material may be applied in the absence of binder components that react to form a coating layer when cured such as through crosslinking. That is, the first material may be applied to the substrate or a previously applied coating as a non-film forming composition that does not form a separate coating layer. Thus, the first material may not be contained in a coating composition that can be cured to form a coating layer which is separate from the coating layer formed from the powder coating composition applied directly over the substrate to which the first material has been applied. The dry film thickness of any potential resulting film, even if one or more binder components are present, may be less than 2.5 microns, less than 2 microns, less than 1.5 microns, less than 1 micron, or less than 0.5 micron, or less than 0.25 micron, or less than 0.1 micron.

The first material can be applied such that any other optional components applied together with the first material are substantially free, essentially free, or completely free of binder components that react to form a separate coating layer from the powder coating layer when cured. The term "substantially free" as used in this context means the optional components applied with the first material contain less than 1000 parts per million (ppm), "essentially free" means less than 100 ppm, and "completely free" means less than 20 parts per billion (ppb) of binder components that react to form a separate coating layer from the powder coating layer when cured, based on the total weight of all the components. For example, the first material can be applied such that any other optional components combined and applied together with the first material are substantially free, essentially free, or completely free of self-crosslinkable film-forming resins, a film-forming resin and a crosslinker reactive with the film-forming resin, and/or a film-forming resin reactive with the first material. The first material can also be applied such that any other optional components combined and applied together with the first material are substantially free, essentially free, or completely free of any type of a film-forming resin. For instance, the first material can comprise a catalyst, a rheology modifier, and/or a crosslinker as previously described and any other optional components combined and applied together with the first material may be substantially free, essentially free, or completely free of a film-forming resin including any of the previously described film-forming resins.

One method for applying the first material to the substrate comprises dipping the substrate into a solution that contains the first material. The solution can be, for example, a pretreatment bath. As used herein, a "pretreatment bath" refers to a liquid bath containing the first material and that may optionally contain other components typically found in any type of pretreatment bath. Non-limiting examples of pretreatment baths that the first material can be incorporated into include a cleaner bath, a deoxidizer bath, a cleaner-coater bath, a rinse conditioner bath, a pretreatment coating bath, a rinsing bath, a sealing bath, or a deionized water rinsing bath. It will be appreciated that the first material can be added to any commercially available pretreatment product. It will also be appreciated that when spray pretreatments are used, immersion steps may be avoided entirely.

A "cleaner bath" is a bath comprising materials for removing grease, dirt, or other extraneous matter from the substrate. Non-limiting examples of materials for cleaning the substrate include mild or strong alkaline cleaners.

A "deoxidizer bath" is a bath comprising materials for removing an oxide layer found on the surface of the substrate such as acid-based deoxidizers. Non-limiting examples of acid-based deoxidizers include phosphoric acid, citric acid, nitric acid, fluoroboric acid, sulfuric acid, chromic acid, hydrofluoric acid, and ammonium bifluoride.

A "cleaner-coater bath" is a bath comprising materials for both cleaning and coating the substrate in the same stage. The cleaner-coater bath can therefore clean the substrate, for example as with a mild or strong alkaline cleaner, and then coat the substrate, for example with a pretreatment coating as previously described, in a single step. A non-limiting example of a cleaner-coater includes CHEMFOS 51HD, commercially available from PPG.

A "rinse conditioner bath" is a bath comprising activating agents for increasing the number of activation sites on the surface of the substrate for improved reaction with a pretreatment composition in order to enhance the protection of the substrate. A non-limiting example of a rinse conditioner bath is a bath comprising activating agents that increase the number of sites on the surface of the substrate where phosphate crystals form upon application of a phosphate coating.

A "pretreatment coating bath" refers to a bath comprising a composition for forming a protective layer over the surface of the substrate. Non-limiting examples of pretreatment compositions include any of the pretreatment compositions previously described.

A "rinsing bath" is a bath comprising a solution of rinsing agents to remove any residue after application of a cleaner or pretreatment layer such as a phosphate containing pretreatment layer. In some non-limiting examples, a rinsing bath may simply contain city water or de-ionized water.

A "sealing bath" is a bath comprising a solution or dispersion that is capable of affecting a material deposited onto a substrate in such a way as to enhance its physical and/or chemical properties. Sealer compositions generally utilize solubilized metal ions and/or other inorganic materials to enhance the protection (e.g., corrosion protection) of pretreated substrates. Non-limiting examples include CHEMSEAL 59 and CHEMSEAL 100, both which are commercially available from PPG.

A "deionized water rinsing bath" is a bath that comprises deionized water and can be utilized in multiple stages of a pretreatment process such as a final rinsing stage before drying.

Other non-limiting examples of application methods that can be used to apply the first material onto the substrate include: spraying, such as by incorporating the first material into a liquid formulation and using spray equipment; wiping where the first material is contained on and/or in a wipe and manually or automatically wiped; media blasting where the first material is a solid and is blasted onto the substrate's surface; electrostatically applied as a powder such as after being micronized into a powder with a desired particle size; brushing or rolling the first material over the substrate such as by incorporating the first material into a formulation (e.g., liquid or gel) that can be brushed or rolled; vapor deposition; electrodeposition where the formulation is liquid and is electro-coated; or any combination thereof. The first material may also be applied in-mold, during extrusion, during a calendaring, or during other processing of substrate materials.

As previously described, the method for applying the first material to the substrate can comprise dipping the substrate into a solution or dispersion that contains the first material. It is appreciated that the dispersion can be formed by first preparing the first material in solid form, such as a micronized powder, and then dispersing the solid first material into the liquid medium, such as to form a slurry.

The previously described methods of applying the first material can also be used in the absence of binder components as previously described. For example, the previously described baths can be substantially free, essentially free, or completely free of binder components that react to form a separate coating layer from the powder coating layer when cured. The term "substantially free" as used in this context means that the methods such as the baths use or contain less than 1000 parts per million (ppm), "essentially free" means less than 100 ppm, and "completely free" means less than 20 parts per billion (ppb) of binder components that react to form a separate coating layer from the powder coating layer when cured, based on the total weight of the components such as the components that form the baths.

The first material can be deposited onto the substrate by one or more of any of the previously described methods. The first material can also be applied alone or in combination with other treatments or coating processes. For example, the substrate of the present invention can be dipped or submerged into one or more of any of the previously described baths that include the first material during treatment of the substrate. For instance, the first material can be incorporated into: a cleaner bath to apply the first material directly over the surface substrate; a pretreatment coating bath to apply the first material over the substrate together with the pretreatment layer; or a final deionized water rinse to apply the first material over a pretreatment layer. In another non-limiting example, the substrate is sprayed or wiped with a solution that comprises the first material after application of a pretreatment layer or primer layer. In another non-limiting example, the first material may be present in more than one process step.

The substrate can undergo various treatments prior to application of the first material. For instance, the substrate can be alkaline cleaned, deoxidized, mechanically cleaned, ultrasonically cleaned, solvent wiped, roughened, plasma cleaned or etched, exposed to chemical vapor deposition, treated with an adhesion promoter, plated, anodized, annealed, cladded, or any combination thereof prior to application of the first material. The substrate can be treated using any of the previously described methods prior to application of the first material such as by dipping the substrate in a cleaner and/or deoxidizer bath prior to applying the first material. The substrate can also be plated prior to applying the first material. As used herein, "plating" refers to depositing a metal over a surface of the substrate. The substrate may be also be 3D printed.

The substrate according to the present invention can be selected from a wide variety of substrates and combinations thereof. Non-limiting examples of substrates include vehicles including automotive substrates, industrial substrates, marine substrates and components such as ships, vessels, and on-shore and off-shore installations, storage tanks, packaging substrates, aerospace components, batteries and battery components, bus bars, metal wires, copper or aluminum conductors, wood flooring and furniture, fasteners, coiled metals, heat exchangers, vents, an extrusion, roofing, wheels, grates, belts, conveyors, grain or seed silos, wire mesh, bolts or nuts, a screen or grid, HVAC equipment, frames, tanks, cords, wires, apparel, electronic components, including housings and circuit boards, glass, sports equipment, including golf balls, stadiums, buildings, bridges, containers such as a food and beverage containers, and the like.

The substrates, including any of the substrates previously described, can be metallic or non-metallic. Metallic substrates include, but are not limited to, tin, steel, cold rolled steel, hot rolled steel, steel coated with zinc metal, zinc compounds, zinc alloys, electrogalvanized steel, hot-dipped galvanized steel, galvanealed steel, galvalume, steel plated with zinc alloy, stainless steel, zinc-aluminum-magnesium alloy coated steel, zinc-aluminum alloys, aluminum, aluminum alloys, aluminum plated steel, aluminum alloy plated steel, steel coated with a zinc-aluminum alloy, magnesium, magnesium alloys, nickel, nickel plating, bronze, tinplate, clad, titanium, brass, copper, silver, gold, 3-D printed metals, cast or forged metals and alloys, or combinations thereof.

Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) (PET), polycarbonate, engineering polymers such as poly(etheretherketone) (PEEK), polycarbonate acrylobutadiene styrene (PC/ABS), polyamide, wood, veneer, wood composite, particle board, medium density fiberboard, cement, stone, glass, paper, cardboard, textiles, leather both synthetic and natural, composite substrates such as fiberglass composites or carbon fiber composites, 3-D printed polymers and composites, and the like.

As used herein, "vehicle" or variations thereof include, but are not limited to, civilian, commercial and military aircraft, and/or land vehicles such as airplanes, helicopters, cars, motorcycles, and/or trucks. The shape of the substrate can be in the form of a sheet, plate, bar, rod or any shape desired.

Further, a "package" is anything used to contain another item, particularly for shipping from a point of manufacture to a consumer, and for subsequent storage by a consumer. A package will be therefore understood as something that is sealed so as to keep its contents free from deterioration until opened by a consumer. The manufacturer will often identify the length of time during which the food or beverage will be free from spoilage, which typically ranges from several months to years. Thus, the present "package" is distinguished from a storage package or bakeware in which a consumer might make and/or store food; such a package would only maintain the freshness or integrity of the food item for a relatively short period. "Package" as used herein means the complete package itself or any component thereof, such as an end, lid, cap, and the like. A package according to the present invention can be made of metal or non-metal, for example, plastic or laminate, and be in any form. An example of a suitable package is a laminate tube. Another example of a suitable package is metal can. The term "metal can" includes any type of metal can, package or any type of receptacle or portion thereof that is sealed by the food/beverage manufacturer to minimize or eliminate spoilage of the contents until such package is opened by the consumer. Packages coated with the composition of the present invention can also include plastic bottles, plastic tubes, laminates and flexible packaging, such as those made from PE, PP, PET and the like.

As indicated, the powder coating composition is directly applied to at least a portion of the substrate to which the first material is applied. That is, the powder coating composition is directly applied to at least a portion of the substrate to which the first material has been applied, such that the first material and the powder coating composition are in contact with each other without any intermediate coating layers in between. The powder coating composition can be applied to the substrate to which the first material is applied without any intervening steps such as drying or heating steps. Alternatively, an additional process step(s) can be conducted before applying the powder coating composition including, but not limited to, drying by air and/or heating the first material. For example, the first material can be applied in a final deionized water rinse or in a pretreatment composition and then dried by air or heat before applying the powder coating composition. The first material can also be applied to the substrate followed by a rinsing step.

After application of the powder coating composition, the first material can be localized at the interface or point of contact between the first material and the liquidized powder coating composition. That is, the first material can be in contact with the liquidized powder coating composition but does not migrate into the liquidized powder coating composition. Alternatively, at least a portion of the first material can migrate into at least a portion of the liquidized powder coating composition. For instance, the first material can migrate into a portion of the bulk region of the liquidized powder coating composition.

The powder coating composition can be applied to the substrate to which the first material is applied to form a monocoat. As used herein, a "monocoat" refers to a single coating layer that is free of additional coating layers. Thus, the powder coating composition can be applied directly to a substrate and cured to form a single layer coating, i.e. a monocoat.

The coated substrate of the present invention may further comprise one or more additional coating layers, such as a second coating composition deposited onto at least a portion of the first powder coating composition, to form a multi-layer coating such as by applying a topcoat. When a multi-layer coating is formed, the first powder coating composition can be cured prior to application of additional coating compositions, or one or more of the additional coating compositions and the first powder coating composition can be cured simultaneously. It is appreciated that the second coating composition and/or additional coating compositions can be in solid or liquid form.

The interaction between the powder coating composition and the first material has been found to effect one or more aspects of the powder coating composition. For example, the interaction between the liquidized powder coating composition and the first material may cause a lower interfacial flow of the liquidized powder coating composition in contact with at least a portion of the substrate to which the first material has been applied than the interfacial flow of the same powder composition liquidized under the same conditions that is in contact with an identical substrate with the exception that no first material has been applied or with a portion of the same substrate to which the first material has not been applied. As such, when the powder coating composition comes into contact with the first material that has been applied to the substrate and is liquidized, the flow of the liquidized powder coating composition at the contacting interface with the first material can decrease and is therefore lower as compared to the same liquidized powder coating composition not in contact with the first material. The interaction between the liquidized powder coating composition and the first material may also produce a higher viscosity in the liquidized powder coating composition than the viscosity of the same powder coating composition liquidized under the same conditions that is not in contact with the first material. The viscosity increase of the liquidized powder coating composition can be localized and increase at the interface of the first material, or can extend through all or part of the liquidized powder coating composition.

The decrease in interfacial flow and the increase in viscosity of the liquidized powder coating composition described herein can be demonstrated through various experiments including crosslink density and cure times. For instance, the coatings of the present invention have a higher crosslink density as compared to a coating deposited from the same powder coating composition applied over a substrate that is free of the first material. The first material applied to the substrate therefore decreases the interfacial flow and increases the viscosity of the liquidized powder coating composition to allow better crosslinking.

The crosslink density can be tested with MEK (methyl ethyl ketone) double rubs in which the index finger of a tester holds a double thickness of cheesecloth saturated with MEK at a 45 degree angle to the coated panel surface. Each rub is performed with one stroke away from the tester and one return stroke toward the tester. The rubs are performed with moderate pressure at a rate of about 1 double rub per second and are at least 4" long. The cheesecloths are remoistened with MEK every 25 to 50 rubs to ensure the applicator remains wet throughout the test. The double rubs are performed until failure of the coating where the coating is removed from the panel.

The degree of crosslinking is also demonstrated by other methods including, but not limited to, solvent soaking and thermomechanical analysis. In the solvent soaking test, coated substrates are soaked in a solvent such as acetone, for example for 24 hours. The coating thickness after solvent soaking is then compared to the coating thickness prior to solvent soaking. The greater the coating thickness retention after solvent soaking, the greater the degree of crosslinking. The coating thickness before and after solvent soaking is measured using 3D digital Macroscope.

For thermomechanical analysis, a Q400 thermomechanical analyzer from TA Instruments Inc. is utilized to investigate the crosslinked structure by monitoring temperature-driven penetration behavior. During such testing, a constant ramp of 10° C./min with a fixed force of 0.1 N can be applied in the temperature range of 25° C.-150° C. with the force being maintained until the system cooled down below 25° C. A full penetration of the entire coating demonstrates a lower crosslinking degree as compared to partial penetration or two step partial penetration behavior.

The interaction with the first material may also cause a higher crosslink density at the interface where the powder coating composition contacted the first material. For example, the coating formed from the powder coating composition can have a higher crosslink density at a lower portion where the powder coating composition contacted the first material such that the crosslink density is lower/decreases at a higher portion of the coating above the lower portion that contacted the first material.

As indicated, the decrease in interfacial flow and the increase in viscosity of the liquidized powder coating composition can also be shown by testing the cure times that the first material provides as compared to the cure times of the powder coating composition without the first material. For instance, it was found that the first material provides a significantly faster gel time when heated with the components of the powder coating composition as compared to the gel time of the powder coating composition that is free of the first material.

After applying the powder coating composition onto the substrate to which the first material has been applied, at least a portion of the powder coating composition can have high pill flow rate while also exhibiting good edge coverage and coating appearance as described herein. For instance, at least a portion of the powder coating composition can have a pill flow rate of greater than 30 mm while also exhibiting good edge coverage and coating appearance. The pill flow rate, as reported herein, is measured according to ASTM D3451-06 (2017) and ISO 8130-11, in which a 65° inclined plane frame was used to hold a 20 inch by 12 inch glass plate. The glass plate and frame are heated to 300° F. for 20 minutes before pellets are dropped on the horizontal plate and allowed to sit one minute before tilting to a 45° angle. The coated plate is then allowed to sit in the oven for 15 minutes before pulling the glass plate and frame out of the oven and cooling. Flow is measured from the top to bottom and reported as millimeters of pill flow. This test is referred to herein as the "pill flow test".

As a result of the interaction between the first material and the powder coating composition, reduced bare metal exposed area on edges as well as improved coating coverage over the edges and corners of the substrate has been observed. This may occur, for example, from a lower interfacial flow at an interface of the first material and the liquidized powder coating composition, as well as from a higher viscosity of at least a portion of the liquidized powder coating composition. For instance, the coated substrates of the present invention may have greater dry film thicknesses at the edges as compared to dry film thicknesses at the edges of substrates coated with the same composition but without the first material. The coated substrates of the present invention, for example, may have a dry film thickness at an edge of the substrate of 2 μm or greater, or 5 μm or greater, or 8 μm or greater, or 10 μm or greater, or 12 μm or greater. The coated substrates of the present invention may have a dry film thickness at an edge of the substrate of up to 25 μm, or up to 20 μm, or up to 15 μm. The coated substrates of the present invention may have a dry film thickness at an edge of the substrate within a range, such as for example, from 2 μm to 25 μm, or from 5 μm to 20 μm, or from 8 μm to 20 μm.

The coated substrates of the present invention may have a more consistent or uniform dry film thickness across the surface of the substrate as compared to substrates coated with the same composition but without the first material. That is, the dry film thicknesses at the edges of the coated substrates of the present invention may be more consistent with the dry film thickness at other portions of the substrate toward the center of the substrates, which are historically easier to coat as compared to the edges. For example, the coated substrate of the present invention may have a ratio of a dry film thickness at an edge of the substrate to a dry film thickness 10 mm away from the edge toward the center of the substrate within a range of from 1:3 to 1:15, or from 1:3 to 1:10, or from 1:4 to 1:12, or from 1:4 to 1:8.

The coated substrate of the present invention may have improved corrosion resistance due to improved coating coverage over the edges and corners of the substrate. Particularly, it was found that the coated substrates of the present invention may exhibit less than or equal to 10% linear edge corrosion after 20 or 40 cycles according to SAE J2334. During this corrosion testing, the coated substrates are cleaned, dried, and held against a template with 3 mm wide blocks after exposure. The percent (%) linear edge corrosion of the coated substrate is then determined by counting the number of marked square blocks on the substrate edges that exhibit corrosion products, blisters, and adhesion failure. The percent defects are calculated by taking the total number of squares with defects divided by the total number of squares from the evaluated edges. Good edge coverage is demonstrated with an average value of 3 test substrates below 20% linear edge corrosion, and excellent edge coverage is demonstrated with an average value of 5% or less linear edge corrosion. This linear edge corrosion testing is referred to herein as the "linear edge corrosion test".

The coated substrate of the present invention may also have improved filiform corrosion resistance. Particularly, it was found that the coated substrates of the present invention may provide improved filiform corrosion resistance (tested in accordance with SAE J2635 "Filiform Corrosion Test Procedure for Painted Aluminum Wheels and Painted Aluminum Wheel Trim"), as compared to coated substrates not treated with the first material.

The coated substrate of the present invention may also have improved scribe corrosion resistance. Particularly, it was found that the coated substrates of the present invention may provide improved corrosion resistance when tested in accordance with ASTM-B117-18 and by applying a scribe down the middle of the substrate before measuring the total scribe creep, as compared to coated substrates not treated with the first material.

As indicted, the coated substrates may have good coating appearance. Particularly, the coated substrates of the present invention may have an R-value, which can be used to measure coating appearance, that is close to or the same as an R-value obtained from a substrate coated with the same composition but without the first material. For example, the coated substrates of the present invention have been found to have R-values of 75% or greater, or 80% or greater, or 85% or greater, or 90% or greater, or 95% or greater, or 100%, of an R-value of a substrate coated with the same composition but without the first material.

The R-values of the coated substrates, as reported herein, are determined by first measuring the longwaves and shortwaves of the coating substrate using a YK Wavescan Plus available from BYK-Gardner USA, which measures surface topography via an optical profile. The wave scan instrument uses a point source (i.e. laser) to illuminate the surface over a predetermined distance, for example 10 centimeters, at an angle of incidence of 60°. The reflected light is measured at the same, but opposite angle. As the light beam hits a "peak" or "valley" of the surface, a maximum signal is detected; when the beam hits a "slope" of a peak/valley a minimum signal is registered. The measured signal frequency is equal to double spatial frequency of the coating surface topography. Data are divided into longwave (structure size >0.6 mm) and shortwave (structure size <0.6 mm) signals using a mathematical filter function. The R-value is then determined within a scale of 0-10.5, with 10.5 signifying the best appearance. The calculation for R-Value is as follows: R=10.5 −4*log (a−0.02*|b−20|), where a=20*(10^(Longwave/67)−1) and b=20*(10^(Shortwave/67)−1). If R>10.5, then R=10.5. If |b−20|>40, then |b−20|=40. This appearance testing is referred to herein as the "R-value test".

Substrates coated according to the present invention may have one or more improved properties and/or may address one or more issues known in the coating industry. This may include, for example: improved coating edge coverage; more uniform coverage across the entire surface of a substrate including the edges and/or corners; improved sealing over the entire surface of a substrate including the edges and/or corners; increased sag resistance; improved adhesion; and/or improved chip resistance such as resistance during shipping and storing of the coated substrate. As used herein, "sag" refers to as the undesirable flow of the coating on vertical or near-vertical surfaces that produce films of unequal thickness. "Sag resistance" therefore refers to the resistance of the coating to flow on vertical or near-vertical surfaces.

It is appreciated that a substrate comprising the first material allows for the application of various types of coating layers with improved properties including, but not limited to, a multi-layer coating where at least two of the coating layers are formed from powder coating compositions that have the same or different pill flow rates. For example, a multi-layer coating can be formed over the substrate comprising the first material in which the multi-layer coating is obtained from at least two powder coating compositions that both have a pill flow rate over 40, a pill flow rate below 40, or where one composition (the first or second composition) has a pill flow rate above 40 and the other composition (the first or second composition) has a pill flow rate below 40. A non-limiting example of such a multi-layer coating includes a first coating layer formed from a powder composition with low amounts of rheology modifier and a pill flow rate over 40, or over 50, that is applied onto the treated substrate, followed by a powder coating layer formed from a second powder composition with a pill flow rate over 40, or over 50, and which can provide improved film build at the edges of the substrate in the cured multi-layer coating.

The coating composition applied over the substrate comprising the first material can also be selected based on the properties the resulting coating provides. For example, the powder coating composition can be selected to form a dielectric coating over the treated substrate. A "dielectric coating" refers to a coating that is electrically insulating. Powder coating compositions for preparing dielectric coatings can comprise, for example, any of the components previously described provided that the coating is electrically insulating.

The present invention also relates to methods including, for example, methods for treating a substrate, sealing at least a portion of a surface of a substrate, decreasing sag resistance, and/or improving edge coverage comprising: contacting at least a portion of the substrate with the first material; directly contacting at least a portion of the substrate in contact with the first material with a powder coating composition comprising a film-forming resin, and optionally a crosslinker reactive with the film-forming resin; and liquidizing the powder coating composition to form a coating layer of the powder coating composition on the substrate. The methods of the present invention cause the powder coating composition to come into contact with the first material. The resulting interaction between the liquidized powder coating composition and the first material provided by the method of the present invention effects one or more aspects of the coating composition as previously described including, for example, a lower interfacial flow of the liquidized powder coating composition and/or a higher viscosity of the liquidized powder coating composition as compared to the interfacial flow or viscosity of the same powder composition liquidized under the same conditions that is in contact with an identical substrate with the exception that no first material has been applied or with a portion of the same substrate to which the first material has not been applied.

The first material and powder coating composition used in the methods of the present invention include any of the first materials and powder coating compositions previously described. The first material can also be applied to the substrate, such as directly to the substrate without any intermediate layers, using any of the previously described methods including, for example, dipping, rinsing, wiping, spraying, vapor or electrodepositing, brushing, rolling, or blasting.

The methods of the present invention can also include any of the additional steps described herein. For example, the methods of the present invention can also comprise: treating, plating, and/or applying a pretreatment composition to the substrate before applying the first material; drying the substrate after applying the first material by air and/or heat; and/or applying one or more additional coating compositions.

The substrates coated according to the methods of the invention may include any of the previously described substrates and materials. Different steps can be used to coat certain substrates and materials for particular end uses and applications. For example, a coil can be coated by: contacting at least a portion of the coil with the first material; rolling the coil for storage and/or shipping; unrolling the coil at later period of time; directly contacting at least a portion of the coil in contact with the first material with a powder coating composition comprising a film-forming resin, and optionally a crosslinker reactive with the film-forming resin; and liquidizing the powder coating composition to form a coating layer of the powder coating composition on the coil. The coil can also be stamped or formed before or after applying the powder coating composition.

The following examples are presented to demonstrate the general principles of the invention. The invention should not be considered as limited to the specific examples presented. All parts and percentages in the examples are by weight unless otherwise indicated.

Examples 1-7

Preparation and Application of Modified Water Rinses

Deionized water rinses containing a catalyst, crosslinker, or rheology modifier were first prepared by mixing the components listed in Table 1 at room temperature.

TABLE 1

| Component | Ex. 1 (grams) | Ex. 2 (grams) | Ex. 3 (grams) | Ex. 4 (grams) | Ex. 5 (grams) | Ex. 6 (grams) |
|---|---|---|---|---|---|---|
| Hydromax ® 300 [1] | 1.25 | 1.25 | 1.25 | 1.25 | 1.25 | 1.25 |
| TRITON CF-10 [2] | 0.07 | 0.07 | 0.07 | 0.07 | 0.07 | 0.07 |
| Deionized water | 96.69 | 92.44 | 92.44 | 94.69 | 96.69 | 84.4 |
| Tetrabutyl phosphonium bromide | 2.00 | 0 | 0 | 0 | 0 | 0 |
| EPOCROS K-2030E [3] | 0 | 6.25 | 0 | 0 | 0 | 0 |
| CARBODILITE V-02-L2 [4] | 0 | 0 | 6.25 | 0 | 0 | 0 |
| CARDOLITE NX-8101 [5] | 0 | 0 | 0 | 4.00 | 0 | 0 |
| ACRYSOL RM-12W [6] | 0 | 0 | 0 | 0 | 2.0 | 0 |
| SNOWTEX ST-O [7] | 0 | 0 | 0 | 0 | 0 | 14.28 |

[1] A hydrotrope, nonionic surfactant solubilizer, and electrostatic agent, commercially available from Alfa Chemicals.
[2] A nonionic surfactant, commercially available from DOW.
[3] Styrene/acrylic-based oxazoline functionalized reactive copolymer crosslinker, commercially available from Nippon Shokubai.
[4] A polycarbodiimide based crosslinking agent, commercially available from Nisshinbo Chemical Inc.
[5] An epoxy curing agent, commercially available from Cardolite.
[6] A nonionic urethane rheology modifier, commercially available from Dow chemical company.
[7] Colloidal silica, commercially available from Nissan Chemical.

Bare cold rolled steel panels, 4×12×0.32 inch available from ACT item #10161 were first cleaned with MEK solvent, then iron phosphate pretreated with Chemfos® 51HD (a cleaner-coater designed to remove soils and deposit a phosphate coating, commercially available from PPG) solution at 140° F. for 2 minutes. Each of the panels were next rinsed with deionized water. The panels were then dipped into the deionized water rinses containing the components listed in Table 1 for 2 minutes. All panels were dried in an oven for 2 minutes at 110° C. and allowed to cool to room temperature.

In addition, a control panel (Comparative Example 7) was also prepared by dipping the panel into a Chemfos® 51HD solution at 140° F. for 2 minutes, and then rinsing with deionized water. The panel was dried in an oven for 2 minutes at 110° C. and allowed to cool to room temperature.

Example 8

Preparation of Coated Substrates

The substrates of each of Examples 1-7 were electrostatically sprayed with a powder coating composition comprising a carboxylic acid functional polyester, a triglycidyl isocyanurate cross-linker, and standard additives and fillers using a Nordson LAD series electrostatic spray system at 35 kV with 9 psi flow and 10 psi fluidization settings with a slot tip. The powder coating compositions were sprayed at 40-50% relative humidity. The powder coating compositions were applied on the front and back of the substrates at a dry film thickness of 50 microns to 100 microns. The powder coating were heated in an electric oven (Despatch LAD series electric oven) for 20 minutes at 375° F. to cure and form the coatings.

Example 9

Evaluation of Coated Substrates

The coated substrates of Example 8 were tested for coating appearance. The coating appearance of each coating was tested by the R-value test previously described herein. The resulting R-values of the coatings formed over the substrates of Examples 1-7 are listed in Table 2.

TABLE 2

| Substrate coated | R-value |
|---|---|
| Example 1 | 4.8 |
| Example 2 | 4.6 |
| Example 3 | 5.2 |
| Example 4 | 5.4 |
| Example 5 | N/A |
| Example 6 | N/A |
| Comparative Example 7 | 5.0 |

As shown in Table 2, the R-values of the coated substrates treated with the deionized water rinses containing catalyst, crosslinker, or rheology modifier of Examples 1-4 exhibited similar R-values as compared to the coated substrate of Comparative Example 7 that was not treated with the deionized water rinses containing catalyst, crosslinker, or rheology modifier.

Examples 10 and 11

Preparation and Application of a Solution Containing Catalyst

A deionized water rinse containing a catalyst was first prepared from the components listed in Table 3.

TABLE 3

| Components | Example 10 (grams) |
|---|---|
| Deionized water | 96.69 |
| Tetrabutyl phosphonium bromide | 2 |
| TRITON CF-10[1] | 0.07 |
| Hydromax ® 300[2] | 1.25 |

Bare cold rolled steel panels, 4×12×0.32 inch available from ACT item #10161 were dipped into the deionized water rinses containing the components listed in Table 3 for 2 minutes. The panels were dried in an oven for 3 minutes at 110° C. and allowed to cool to room temperature. In addition, an untreated panel was selected as a control (Comparative Example 11).

Example 12

Preparation of Coated Substrates

Three substrates of each of Examples 10 and 11 were electrostatically sprayed with a powder coating composition comprising a carboxylic acid functional polyester, a triglycidyl isocyanurate cross-linker, and standard additives and fillers using a Nordson LAD series electrostatic spray system at 35 kV with 9 psi flow and 10 psi fluidization settings with a slot tip. The powder coating compositions were sprayed at 40-50% relative humidity. The powder coating compositions were also applied on the front and back of the substrates at a dry film thickness of 50 microns to 100 microns. The powder coatings were heated in an electric oven (Despatch LAD series electric oven) for 20 minutes at 375° F. to cure and form the coatings.

Example 13

Evaluation of Coated Substrates

The coated substrates of Example 12 were tested for linear edge corrosion. The linear edge corrosion of each coated substrate was tested by the linear edge corrosion test previously described herein. The resulting linear edge corrosion percentages of the coated substrates are listed in Table 4.

TABLE 4

| Substrate coated | % Linear Corrosion |
|---|---|
| Example 10 | 3.5 |
| Comparative Example 11 | 95 |

As shown in Table 4, the coated substrates treated with the deionized water rinse containing catalyst of Example 10 exhibited low linear edge corrosion percentages as compared to the coated substrates of Comparative Example 11 that were not treated with the deionized water rinse containing catalyst.

Example 14

Application of a Solution Containing Catalyst Using Different Application Techniques The solution containing the catalyst described in Example 10 and shown in Table 3 was applied to bare cold rolled steel panels, 4×12×0.32 inch available from ACT item #10161, that were shear cut along the sides and bottom of the panel ~1/16 of an inch or less off to provide sharp edges for testing. The sheared test panels were first cleaned with MEK solvent, then iron phosphate pretreated with Chemfos 51HD® solution at 140° F. for 2 minutes, and finally rinsed with deionized water. Each panel was then treated with the solution containing the catalyst using different application methods on the bottom half of the panels.

The first method of application comprised dipping the panel half way into the treatment solution for 20 seconds. The second method of application comprised applying the treatment solution on the edges by wetting a Q-tip with the treatment solution and applying the solution evenly to the edges on the bottom half of the test panel. The third method of application comprised filling a spray bottle with the treatment and spraying the treatment solution onto the bottom half of the test panel. After the treatment solution was applied, the panels were dried for 2 minutes at 110° C. and allowed to cool to room temperature.

Example 15

Preparation and Evaluation of Coated Substrates

The substrates of Example 14 were electrostatically sprayed with a powder coating composition comprising a carboxylic acid functional polyester, a triglycidyl isocyanurate cross-linker, and standard additives and fillers using a Nordson LAD series electrostatic spray system at 35 kV with 9 psi flow and 10 psi fluidization settings with a slot tip. The powder coating compositions were sprayed at 40-50% relative humidity. The powder coating compositions were also applied on the front and back of the substrates at a dry film thickness of 50 microns to 100 microns. The powder coating were heated in an electric oven (Despatch LAD series electric oven) for 20 minutes at 375° F. to cure and form the coatings.

The coated substrates were tested by the R-value test previously described herein. The average edge coverage of each coated substrate was also tested.

The edge coverage was tested using FE-SEM Analysis. For the edge coverage test, small square sections were cut from an area of each panel with no surface treatment (top right, top left), and an area with surface treatment (bottom right, and bottom left edges) with a panel cutter and mounted in epoxy overnight. After curing, the mounts were ground, polished, and placed on aluminum stubs with carbon tape. Samples were then coated with Au/Pd for 20 seconds and analyzed in a Quanta 250 FEG SEM under high vacuum. The accelerating voltage was set to 20.00 kV and the spot size was 3.0. The samples were viewed in both secondary and back-scatter mode depending on which image allowed the best contrast. Three dry film thickness measurements were collected from around the front and back panel edges and averaged to provide average edge coverage measurements for each area. The measurements were taken at the thinnest part of the coating at the edge of the substrate.

The test results of the R-value and average edge coverage are listed in Table 5.

TABLE 5

| Application method | R-value untreated top | R-value treated bottom | μm Average edge coverage untreated top | μm Average edge coverage treated bottom |
|---|---|---|---|---|
| Immersion | 3.8 | 3.1 | 2.8 | 10.2 |
| Wipe-Q-tip edges | 3.7 | 3.7 | 3.5 | 9.1 |
| Spray applied | 3.8 | 3.0 | 2.9 | 6.9 |

As shown in Table 5, the portions of the coated substrates treated with the different methods all exhibited good R-values and improved edge coverage as compared to the untreated portions of the coated substrates.

Example 16

Application of a Solution Containing Catalyst on Differently Treated Substrates The solution containing the catalyst described in Example 10 and shown in Table 3 was applied to bare cold rolled steel panels, 4×12×0.32 inch available from ACT item #10161, that were shear cut along the sides and bottom of the panel ~1/16 of an inch or less off to provide sharp edges for testing. Prior to applying the treatment solution, the sheared test panels were first cleaned with MEK solvent followed by one of three different surface treatments.

The first surface treatment was an iron phosphate treatment that was applied through Chemfos® 51HD at 140° F. for 2 minutes, and then rinsed with deionized water.

For the second treatment, Zircobond pretreatment panels were first cleaned with a commercially available cleaner from PPG Industries, ChemKleen SP1, in a stainless steel spray cabinet using V-jet nozzles at 10 to 15 psi for two minutes at 49° C., followed by an immersion rinse in DI water for 15 seconds and spray rinsed with DI water for another 15 seconds. Following the cleaning and rinsing, the panels were immersed into a Zircobond 4200 bath (thin film pretreatment commercially available from PPG Industries, Inc.) A five-gallon solution of Zircobond 4200 DM/DR (a zirconium-containing pretreatment composition commercially available from PPG Industries) was prepared according to the manufacturer's instructions. Temperature of the bath was 80° F. and the panels were run through the bath for 2 minutes with low agitation. Panels were then spray rinsed for 15-20 seconds with DI water and warm air dried using a Hi-Velocity handheld blow-dryer made by Oster® (model number 078302-300-000) at a temperature of about 50-55° C. until the panels were dry (about 1-5 minutes).

The third surface treatment involved cleaning the panel surface using PPG Chemi Kleen 2010Lp with a surfactant package at 135° F. The panels were dipped into the cleaner solution for 2 minutes, then DI water rinsed.

The bottom half of the of each of the panels was then dipped into the treatment solution for 10 seconds then allowed to dry in an oven at 110° C. for two minutes.

Example 17

Preparation and Evaluation of Coated Substrates

The substrates of Example 16 were electrostatically sprayed with a powder coating composition comprising a carboxylic acid functional polyester, a triglycidyl isocyanurate cross-linker, and standard additives and fillers using a Nordson LAD series electrostatic spray system at 35 kV with 9 psi flow and 10 psi fluidization settings with a slot tip. The powder coating compositions were sprayed at 40-50% relative humidity. The powder coating compositions were also applied on the front and back of the substrates at a dry film thickness of 50 microns to 100 microns. The powder coating were heated in an electric oven (Despatch LAD series electric oven) for 20 minutes at 375° F. to cure and form the coatings.

The coated substrates were tested by the R-value and average edge coverage tests previously described herein. The test results of the R-value and average edge coverage are listed in Table 6.

TABLE 6

| Panel surface pretreatment | R-value untreated top | R-value treated bottom | μm Average edge coverage untreated top | μm Average edge coverage treated bottom |
|---|---|---|---|---|
| Iron Phosphate | 3.8 | 3.1 | 2.8 | 10.2 |
| Clean only | 3.2 | 2.6 | 1.8 | 7.8 |
| Zirconium | 3.8 | 3.0 | 7.8 | 19.7 |

As shown in Table 6, the portions of each of the coated substrates treated with catalyst all exhibited good R-values and improved edge coverage as compared to the untreated portions of the coated substrates.

Example 18

Application of a Solution Containing Catalyst on Different Substrates

The solution containing the catalyst described in Example 10 and shown in Table 3 was applied to bare cold rolled steel panels, 4×12×0.32 inch available from ACT item #10161, and aluminum 3003 H14, mill finish 0.025"×4"×12" available from Q-panel item A412, that were each shear cut along the sides and bottom of the panel ~1/16 of an inch or less off to provide sharp edges for testing.

The cold rolled steel panel surface was prepared with a simple cleaning of the surface using PPG Chemi Kleen 2010Lp with a surfactant package at 135° F. The panels were dipped into the cleaner solution for 2 minutes, then DI water rinsed.

The aluminum panel surface was cleaned with commercially available ULTRAX 14 AWS at a concentration of 3.5% at 100° F. for 3.5 minutes in a spray tank. After cleaning the bottom half, each of the panels was dipped into the treatment solution for 10 seconds then allowed to dry in an oven at 110° C. for two minutes.

Example 19

Preparation and Evaluation of Coated Substrates

The substrates of Example 18 were electrostatically sprayed with a powder coating composition comprising a carboxylic acid functional polyester, a triglycidyl isocyanurate cross-linker, and standard additives and fillers using a Nordson LAD series electrostatic spray system at 35 kV with 9 psi flow and 10 psi fluidization settings with a slot tip. The powder coating compositions were sprayed at 40-50% relative humidity. The powder coating compositions were also applied on the front and back of the substrates at a dry film thickness of 50 microns to 100 microns. The powder coatings were heated in an electric oven (Despatch LAD series electric oven) for 20 minutes at 375° F. to cure and form the coatings.

The coated substrates were tested by the R-value and average edge coverage tests previously described herein. The test results of the R-value and average edge coverage are listed in Table 7.

TABLE 7

| Substrate | R-value untreated top | R-value treated bottom | μm Average edge coverage untreated top | μm Average edge coverage treated bottom |
|---|---|---|---|---|
| cold rolled steel | 3.2 | 2.6 | 1.8 | 7.8 |
| Aluminum | 3.8 | 3.0 | 5.1 | 9.6 |

As shown in Table 7, the portions of the coated substrates treated with catalyst exhibited good R-values and improved edge coverage as compared to the untreated portions of the coated substrates.

Example 20

Preparation and Application of Different Surface Treatments

Surface treatments containing different treatment materials were prepared by mixing the components listed in Table 8 at room temperature. The solutions containing the carbodiimide, rheology modifier and epoxy cross-linker were held under magnetic stir bar mixing until use.

TABLE 8

| Components | Catalyst Example percent total weight | Crosslinker Example percent total weight | Crosslinker Example percent total weight | Rheology Modifier Example percent total weight |
|---|---|---|---|---|
| Hydromax ® 300[1] | 1.25 | 1.25 | 1.25 | 1.25 |
| TRITON CF-10[2] | 0.07 | 0.07 | 0.07 | 0.07 |
| Deionized water | 96.69 | 92.44 | 94.69 | 96.69 |
| Tetrabutyl phosphonium bromide | 2.00 | 0 | 0 | 0 |
| CARBODILITE EO5[8] | 0 | 6.25 | 0 | 0 |
| Cardolite NX-8101[9] | 0 | 0 | 4.00 | 0 |
| ACRYSOL RM-12W[6] | 0 | 0 | 0 | 2.0 |

[8]A polycarbodiimide crosslinking agent, commercially available from Nisshinbo Chemical Inc.
[9]An epoxy curing agent, commercially available from Cardolite.

The treatment solutions were applied to bare cold rolled steel panels, 4×12×0.32 inch available from ACT item #10161, that were shear cut along the sides and bottom of the panel ~1/16 of an inch or less off to provide sharp edges for testing. The sheared test panels were first cleaned with MEK solvent, then iron phosphate pretreated with Chemfos® 51HD solution at 140° F. for 2 minutes, and finally rinsed with deionized water. Each panel was then treated with one of the treatment solutions by dipping the panels half way into the respective treatment solution for 10 seconds. The panels were then dried for 2 minutes at 110° C. and allowed to cool to room temperature.

Example 21

Preparation and Evaluation of Coated Substrates

The substrates of Example 20 were electrostatically sprayed with a powder coating composition comprising a carboxylic acid functional polyester, a triglycidyl isocyanurate cross-linker, and standard additives and fillers using a Nordson LAD series electrostatic spray system at 35 kV with 9 psi flow and 10 psi fluidization settings with a slot tip. The powder coating compositions were sprayed at 40-50% relative humidity. The powder coating compositions were also applied on the front and back of the substrates at a dry film thickness of 50 microns to 100 microns. The powder coatings were heated in an electric oven (Despatch LAD series electric oven) for 20 minutes at 375° F. to cure and form the coatings.

The coated substrates were tested by the R-value and average edge coverage tests previously described herein. The test results of the R-value and average edge coverage are listed in Table 9.

TABLE 9

| Panel surface pretreatment | R-value untreated top | R-value treated bottom | μm Average edge coverage untreated top | μm Average edge coverage treated bottom |
|---|---|---|---|---|
| Tetrabutyl phosphonium bromide | 3.2 | 2.6 | 1.8 | 7.8 |
| CARBODILITE EO5[8] | 3.4 | 3.3 | 3.4 | 7.8 |
| Cardolite NX-8101[9] | 3.7 | 3.2 | 2.5 | 6.9 |
| ACRYSOL RM-12W[6] | 4.1 | 3.5 | 1.7 | 7.4 |

As shown in Table 9, the portions of the coated substrates treated with catalyst, crosslinker, or rheology modifier all exhibited good R-values and improved edge coverage as compared to the untreated portions of the coated substrates.

Example 22

Preparation and Application of Treatments Solutions at Different Stages

Treatment solutions were prepared by mixing the components listed in Table 10 at room temperature under magnetic stir bar mixing until use, except for Chemfos® 51HD which was heated to 140° F. at the time of use.

TABLE 10

| Components | Final Rinse Example percent total weight | Pretreatment Example percent total weight | Sealer Example percent total weight |
|---|---|---|---|
| Hydromax ® 300[1] | 1.25 | 0 | 0 |
| TRITON CF-10[2] | 0.07 | 0 | 0 |
| Deionized water | 96.69 | 0 | 0 |
| Tetrabutyl phosphonium bromide | 2.00 | 2.0 | 2.0 |
| Chemfos ® 51HD[10] | 0 | 98 | 0 |
| Chemseal 100[11] | 0 | 0 | 98 |

[10]A chrome-free final rinse, commercially available from PPG.
[11]A chrome-free organic passivation rinse, commercially available from PPG.

The treatment solutions were applied to bare cold rolled steel panels, 4×12×0.32 inch available from ACT item #10161, that were shear cut along the sides and bottom of the panel ~1/16 of an inch or less off to provide sharp edges for testing.

A first set of the sheared test panels were cleaned with MEK solvent, then iron phosphate pretreated with Chemfos 51HD® at 140° F. for 2 minutes, and then finally rinsed with a DI water rinse containing catalyst, as listed in Table 10 as the final rinse Example. Each panel was dried for 2 minutes at 110° C. and allowed to cool to room temperature.

A second set of the sheared test panels were cleaned with MEK solvent, and then iron phosphate pretreated with Chemfos 51HD® containing catalyst and other components at 140° F. for 2 minutes by dipping the panels into the solution, as listed in Table 10 as the pretreatment Example. Each panel was dried for 2 minutes at 110° C. and allowed to cool to room temperature.

A third set of the sheared test panels were cleaned with MEK solvent, iron phosphate pretreated with Chemfos® 51HD at 140° F. for 2 minutes, rinsed with deionized water, and finally sealed with Chemseal 100 containing catalyst, as listed in Table 10 as the sealer Example. Each panel was dried for 2 minutes at 110° C. and allowed to cool to room temperature.

Example 23

Preparation and Evaluation of Coated Substrates

The substrates of Example 22 were electrostatically sprayed with a powder coating composition comprising a carboxylic acid functional polyester, a triglycidyl isocyanurate cross-linker, and standard additives and fillers using a Nordson LAD series electrostatic spray system at 35 kV with 9 psi flow and 10 psi fluidization settings with a slot tip. The powder coating compositions were sprayed at 40-50% relative humidity. The powder coating compositions were also applied on the front and back of the substrates at a dry film thickness of 50 microns to 100 microns. The powder coatings were heated in an electric oven (Despatch LAD series electric oven) for 20 minutes at 375° F. to cure and form the coatings.

The coated substrates were tested by the R-value and average edge coverage tests previously described herein. The test results of the R-value and average edge coverage are listed in Table 11.

TABLE 11

| Stage of treatment | R-value untreated top | R-value treated bottom | μm Average edge coverage untreated top | μm Average edge coverage treated bottom |
|---|---|---|---|---|
| Final Rinse | 3.8 | 3.1 | 2.8 | 10.2 |
| Sealer | 3.7 | 3.9 | 1.9 | 7.7 |
| Pretreatment | 3.8 | 2.9 | 4.51 | 10.5 |

As shown in Table 11, the portions of the coated substrates treated with catalyst all exhibited good R-values and improved edge coverage as compared to the untreated portions of the coated substrates.

Example 24

Preparation and Application of Treatment Solutions

Treatment solutions were prepared by mixing the components listed in Table 12 at room temperature.

TABLE 12

| Components | Catalyst Example percent total weight | Crosslinker Example percent total weight |
|---|---|---|
| Hydromax ® 300[1] | 1.25 | 1.25 |
| TRITON CF-10[2] | 0.07 | 0.07 |
| Deionized water | 96.69 | 94.69 |
| Tetrabutyl phosphonium bromide | 2.00 | 0 |
| Cardolite NX-8101[9] | 0 | 4.00 |

The treatment solutions were applied to bare cold rolled steel panels, 4×12×0.32 inch available from ACT item #10161, that were shear cut along the sides and bottom of the panel ~1/16 of an inch or less off to provide sharp edges for testing. The sheared test panels were first cleaned with MEK solvent, then rinsed with deionized water. The panels were then subjected to a final rinse by dipping the bottom half of the panels for 20 seconds in the solutions and put into an oven to dry for 2 minutes at 110° C.

Example 25

Preparation and Evaluation of Coated Substrates

The substrates of Example 24 were electrostatically sprayed with a powder coating composition comprising either: (1) a carboxylic acid functional polyester, triglycidyl isocyanurate cross-linker, and standard additives and fillers (referred to as "acid epoxy"); (2) an epoxy functional polymer, phenol functional crosslinker, and standard additives and fillers (referred to as "epoxy phenol"); or (3) a carboxylic acid functional polyester, hydroxylalkylamide crosslinker, and standard additives and fillers (referred to as "acid hydroxyalkylamide").

The powders compositions were sprayed with a Nordson LAD series electrostatic spray system at 35 kV with 9 psi flow and 10 psi fluidization settings with a slot tip. The powder coating compositions were sprayed at 40-50% relative humidity. The powder coating compositions were also applied on the front and back of the substrates at a dry film thickness of 50 microns to 100 microns. The powder coatings were heated in an electric oven (Despatch LAD series electric oven) for 20 minutes at 375° F. to cure and form the coatings.

The coated substrates were tested by the R-value and average edge coverage tests previously described herein. The test results of the R-value and average edge coverage are listed in Table 13.

TABLE 13

| Powder chemistry/ surface treatment | R-value untreated top | R-value treated bottom | μm Average edge coverage untreated top | μm Average edge coverage treated bottom |
|---|---|---|---|---|
| Acid Epoxy/catalyst | 3.8 | 3.1 | 2.8 | 10.2 |
| Epoxy phenol/ catalyst | 3.5 | 3.3 | 7.6 | 12.5 |
| Acid Hydroxyalkylamide/ crosslinker | 3.8 | 3.6 | 17.8 | 22.5 |

As shown in Table 13, the portions of the coated substrates treated with catalyst or crosslinker exhibited good R-values and improved edge coverage as compared to the untreated portions of the coated substrates.

Example 26

Crosslink Density Evaluation

The solution containing the catalyst described in Example 10 and shown in Table 3 was applied to bare cold rolled steel panels, 4×12×0.32 inch available from ACT item #10161, that were shear cut along the sides and bottom of the panel ~1/16 of an inch or less off to provide sharp edges for testing. The sheared test panels were first cleaned with MEK solvent, then iron phosphate pretreated with Chemfos® 51HD solution at 140° F. for 2 minutes, and finally rinsed with deionized water. The bottom half of each panel was dipped into the treatment solution for 20 seconds, dried for 2 minutes at 110° C., and allowed to cool to room temperature.

The substrates were then electrostatically sprayed with a powder coating composition comprising a carboxylic acid functional polyester, a triglycidyl isocyanurate cross-linker, and standard additives and fillers using a Nordson LAD series electrostatic spray system at 35 kV with 9 psi flow and 10 psi fluidization settings with a slot tip. The powder coating compositions were sprayed at 40-50% relative humidity. The powder coating compositions were also applied on the front and back of the substrates at a dry film thickness of 50 microns to 100 microns. The powder coatings were heated in an electric oven (Despatch LAD series electric oven) at 375° F. for the period of time listed in Table 14.

The coated substrates were tested for crosslink density by comparing the MEK double rubs of the treated portions and the MEK double rubs of the untreated portions. The test results are listed in Table 14.

TABLE 14

| Bake Conditions | MEK double Rubs Untreated Area | MEK double Rubs Treated Area |
| --- | --- | --- |
| 4 min. @ 375° F. | 18 Fail | 282 Fail |
| 6 min. @ 375° F. | 327 Fail | 500 Mar no break |
| 9 min. @ 375° F. | 500 Mar no break | 500 Mar no break |

As shown in Table 14, the portions of the coated substrates treated with catalyst exhibited improved resistance to MEK double rubs at shorter periods of time as compared to the untreated portions of the coated substrates. The results show that the portions of the coated substrates treated with catalyst provide decreasing interfacial flow of the powder coating composition over the treated substrate due to faster crosslinking of the powder coating.

Example 27

Cure Rate Evaluation

Various solutions were tested for cure rates. Each solution was prepared with the components list in Table 15.

TABLE 15

| Components | Comparative Example (grams) | Catalyst Example (grams) | Cross-linker Example (grams) | Cross-linker Example (grams) | Cross-linker Example (grams) |
| --- | --- | --- | --- | --- | --- |
| Coating components[12] | 2.0 | 2.0 | 2.0 | 2.0 | 2.0 |
| Tetrabutyl phosphonium bromide | 0 | 0.04 | 0 | 0 | 0 |
| EPOCROS K-2030E[3] | 0 | 0 | 0.1 | 0 | 0 |

TABLE 15-continued

| Components | Comparative Example (grams) | Catalyst Example (grams) | Cross-linker Example (grams) | Cross-linker Example (grams) | Cross-linker Example (grams) |
| --- | --- | --- | --- | --- | --- |
| CARBODILITE V-02-L2[4] | 0 | 0 | 0 | 0.1 | 0 |
| Cardolite NX-8101[9] | 0 | 0 | 0 | 0 | 0.08 |

[12] A carboxylic acid functional polyester, a triglycidyl isocyanurate crosslinker, and standard additives and fillers.

Each solution described in Table 15 was measured into a vessel on a 180° C. hot plate. Gel times were measured by mixing the material on the hot plate with a tongue depressor until a gel was formed. A gel was recognized by long strings formed when pulling the mixing stick away from the material on the hot plate. The gel times of each solution is listed in Table 16.

TABLE 16

| | Comparative Example | Catalyst Example | Cross-linker Example | Cross-linker Example | Cross-linker Example |
| --- | --- | --- | --- | --- | --- |
| 180° C. hot plate gel times (seconds) | 142 | 9 | 8 | 7 | 20 |

As shown in Table 16, the solutions containing the crosslinkers and catalyst exhibited faster gel times as compared to the solutions without the crosslinkers or catalyst. The results show that the portions of the coated substrates treated with catalyst provide faster crosslinking of the powder coating and would therefore result in decreased interfacial flow and increased viscosity of the powder coating composition when applied over a substrate treated with the crosslinker or catalyst.

Example 28

Crosslink Degree Evaluation

The solutions containing the catalyst or crosslinkers described in Examples 1-4 and shown in Table 1 were applied to bare cold rolled steel panels, 4×12×0.32 inch available from ACT item #10161. The test panels were first cleaned with MEK solvent, then iron phosphate pretreated with Chemfos® 51HD solution at 140° F. for 2 minutes, and finally rinsed with deionized water. Control panels with no treatments were dried for 2 minutes at 110° C. Two panels for each treatment solution were dipped half way into the respective treatment solution for 10 seconds. The panels were then pulled out of the solution, hung and then dried for 2 minutes at 110° C. and allowed to cool to room temperature.

The substrates were then electrostatically sprayed with a powder coating composition comprising a carboxylic acid functional polyester, a triglycidyl isocyanurate cross-linker, and standard additives and fillers using a Nordson LAD series electrostatic spray system at 35 kV with 9 psi flow and 10 psi fluidization settings with a slot tip. The powder coating compositions were sprayed at 40-50% relative humidity. The powder coating compositions were also applied on the front and back of the substrates at a dry film thickness of 50 microns to 100 microns. The powder coatings were heated in an electric oven (Despatch LAD series electric oven) for 20 minutes at 375° F. for one set of panels and 5 minutes at 375° F. for a second set of panels. For testing, the panels were cut into small pieces (i.e. smaller than 2 cm×2 cm) by a Hand Shear machine (model 24 hand shear, Di-Acro).

The coated substrates were first tested for degree of crosslinking by a solvent soaking test. The solvent soaking test was conducted on the 5 minute baked cut 2 cm×2 cm panels in which the coating thickness retention of the coated substrates were evaluated before solvent soaking the coated substrates and after solvent soaking the coated substrates in acetone for 24 hours at room temperature. Coating thickness retention was determined using a 3D digital Macroscope. The test results are listed in Table 17.

TABLE 17

|  | Control (no treatment) | Catalyst treatment [13] | Carbodiimide Treatment [14] | Oxazoline Treatment [15] | Epoxy treatment [16] |
|---|---|---|---|---|---|
| % Retention coating weight | 0% | 60.5% | 43.8% | 33.4% | 12.8% |

[13] Solution from Example 1.
[14] Solution from Example 2.
[15] Solution from Example 3.
[16] Solution from Example 4.

As shown in Table 17, complete removal of the coating was observed upon acetone soaking the control sample not treated with catalyst or crosslinker. The coating thickness retention was better for the samples treated with catalyst and crosslinker demonstrating a higher degree of crosslinking throughout the coating.

The degree of crosslinking was also evaluated using thermomechanical analysis. For the testing, a Q400 thermomechanical analyzer from TA Instruments Inc. was utilized to investigate the cross linked structure by monitoring temperature-driven penetration behavior. A constant ramp of 10° C./min with a fixed force of 0.1 N were applied in the temperature range of 25° C.-150° C. The force was maintained until the system cooled down below 25° C.

At the short bake time of 5 min for 375° F., the control sample with no treatment exhibited a full penetration of the entire coating at the temperature range in between 80° C. and 140° C. In contrast, all the samples that were treated with catalyst or crosslinker showed partial penetration or two step partial penetration behavior, which demonstrate that the samples treated with catalyst and crosslinker led to higher viscosity (i.e. slower penetration rate) of the powder coating composition as compared to the control due to higher crosslinking degree.

Delamination was also evaluated when the samples were cut into small pieces as previously described. At the short bake time of 5 min for 375° F., the control sample exhibited pronounced delamination upon cutting. In contrast, no delamination was observed for the samples treated with catalyst and crosslinker, which further illustrates the higher levels of crosslinking.

The penetration traces of each sample were also preserved and the details of the traces were evaluated with a Macroscope. The image analysis results showed better coating at the edge for the short bake time of 5 min for 375° F. of the samples treated with catalyst and crosslinker as compared to the control sample, which further confirms better crosslinking.

Example 29

Preparation and Application of Treatment Solutions

Treatment solutions were prepared by mixing the components listed in Table 18 at room temperature.

TABLE 18

| Components | Amount (grams) |
|---|---|
| Hydromax ® 300[1] | 7.5 |
| TRITON CF-10[2] | 0.4 |
| CARBODILITE E-05[17] | 30.0 |
| Deionized water | 559.1 |
| Aluminum oxide C [18] | 3.0 |

[17] A polycarbodiimide based crosslinking agent, commercially available from Nisshinbo Chemical Inc.
[18] Fumed aluminum oxide, commercially available from Cabot Corporation.

The treatment solution was applied to bare cold rolled steel panels, 4×12 inch available from ACT (unpolished item #40821) by dipping the panels into the solution and then drying the panels for 3 minutes at 110° C.

Examples 30-31

Preparation and Evaluation of Coated Substrates

Part A: A powder coating composition was first prepared from the components listed in Table 19.

TABLE 19

| Components | Example 30 (grams) | Example 31 (grams) |
|---|---|---|
| RUCOTE 9010[19] | 602.4 | 0 |
| Polyester resin[20] | 0 | 602.4 |
| Primid ® XL-552[21] | 31.7 | 31.7 |
| Benzoin | 7.5 | 7.5 |
| Micro 520[22] | 7.5 | 7.5 |
| PL-200[23] | 7.9 | 7.9 |
| Anti-crater agent[24] | 7.5 | 7.5 |
| Powdermate ® 542G[25] | 7.50 | 7.5 |
| TiO$_2$ | 270.9 | 270.9 |
| Yellow iron oxide | 4.6 | 4.6 |
| Barimite 10[26] | 60.0 | 60.0 |
| Aerosil ® 200[27] | 1.0 | 1.0 |

[19] Acid functional polyester with an acid number of 28, commercially available from Stepan Company.
[20] Acid functional polyester with an acid number of 39, produced internally by PPG.
[21] Hydroxyalkylamide crosslinker, commercially available from EMS-Primid.
[22] Ethylene Bis(stearamide), commercially available from Clariant Corporation.
[23] Acrylic/silica flow and leveling control agent, commercially available from Estron Chemical.
[24] Imide hydroxyl urethane additive, produced internally by PPG.
[25] Amide modified phenolated urea surfactant, commercially available from Troy Corporation.
[26] Barium sulfate, commercially available from Cimbar Performance Minerals.
[27] Fumed silica, commercially available from Evonik Degussa.

Each of the components were weighed in a container and mixed in a prism high speed mixer for 30 seconds at 3500 RPM to form a dry homogeneous mixture. The mixture was then melt-mixed in a Werner Pfleiderer 19 mm twin screw extruder with an aggressive screw configuration and a speed of 500 RPM. The first zone was set at 50° C., and the second, third, and fourth zones were set at 110° C. The feed rate was such that a torque of 55-65% was observed on the equipment. The mixtures were dropped onto a set of chill rolls (35° F.) to cool and re-solidify the mixtures into solid chips. The chips were weighed and 0.1% of Aerosil® 200 was added before milling in a Mikro ACM®-1 Air Classifying Mill to obtain a particle size of 5 to 90 microns with a majority of the particles being from 20 to 50 microns and an average particle size of approximately 27 microns. The resulting coating compositions were solid particulate powder coating compositions that were free flowing.

Part B: The powder coating compositions of Part A were applied over the treated substrates in Example 29, as well as over untreated substrates as a control, with a Nordson LAD series electrostatic spray system at 75 kV, amperage restricted at 10 mA, 10 psi atomizing and 10 psi conveying flow air. The coating thickness was between 64 µm to 90 µm. The coating was cured at 375° F. for 20 minutes to form a coating layer. Corrosion testing according to ASTM-B117-18 was conducted with a scribe down the middle of the test panels. The panels were exposed to 1000 hours of testing before being scraped free of loose coating and corrosion products. Scribe creep was measured as the total scribe creep based on an average of 5 readings and which was reported in millimeters. The results of the testing are shown in Table 20.

TABLE 20

| Coating Example | Untreated substrate | Treated substrate |
|---|---|---|
| 30 | 6.3 mm | 4.3 mm |
| 31 | 8.0 mm | 2.7 mm |

As shown in Table 20, improved corrosion resistance was obtained from the cured powder coatings applied over the treated substrates in Example 29 as compared to the cured powder coatings applied over untreated substrates.

Example 32

Preparation and Evaluation of Coated Substrates

A powder coating containing a carboxylic acid functional polyester and hydroxyalkylamide crosslinker was applied over the treated substrates in Example 29, as well as over untreated substrates as a control, with a Nordson LAD series electrostatic spray system at 75 kV, amperage restricted at 10 mA, 10 psi atomizing and 10 psi conveying flow air. The coating was applied between 64 µm to 90 µm. The coating was cured at 375° F. for 20 minutes to form a coating layer. Corrosion testing according to ASTM-B117-18 was conducted with a scribe down the middle of the test panels. The panels were exposed to 1000 hours of testing before being scraped free of loose coating and corrosion products. Scribe creep was measured as the total scribe creep based on an average of 5 readings and which was reported in millimeters. The results of the testing is shown in Table 21.

TABLE 21

| Coating Example | Untreated substrate | Treated substrate |
|---|---|---|
| 32 | 10 mm | 2 mm |

As shown in Table 21, improved corrosion resistance was obtained from the cured powder coatings applied over the treated substrates in Example 29 as compared to the cured powder coatings applied over untreated substrates.

Examples 33-35

Preparation of Micronized Surface Treatment Compositions

Micronized surface treatment compositions were prepared from the components listed in Table 22.

TABLE 22

| Components | Example 33 (grams) | Example 34 (grams) | Example 35 (grams) |
|---|---|---|---|
| NPES-903[28] | 490.0 | 0 | 0 |
| Epon ™ 2002[29] | 0 | 490.0 | 0 |
| Tetrabutylphosphonium bromide | 10.0 | 10.0 | 0 |
| CARBODILITE HMV-15CA [30] | 0 | 0 | 500.00 |

[28] Epoxy resin, commercially available from Nan Ya Plastics.

[29] Epoxy resin, commercially available from Hexion Specialty Chemicals.

[30] A solid powder polycarbodiimide based crosslinking agent, commercially available from Nisshinbo Chemical Inc.

Each of the components listed in Table 22 were weighed in a container and mixed in a prism high speed mixer for 30 seconds at 3500 RPM to form a dry homogeneous mixture. The mixture was then melt-mixed in a Werner Pfleiderer 19 mm twin screw extruder with an aggressive screw configuration and a speed of 500 RPM. The first zone was set at 50° C., and the second, third, and fourth zones were set at 110° C. The feed rate was such that a torque of 55-65% was observed on the equipment. The mixtures were dropped onto a set of chill rolls (35° F.) to cool and re-solidify the mixtures into solid chips. The chips were milled in a Mikro ACM®-1 Air Classifying Mill to obtain a particle size of 5 to 100 microns with a majority of the particles being from 20 to 50 microns and an average particle size of approximately 27 microns. The resulting compositions for each of Example were solid particulate compositions that were free flowing.

Examples 36-38

Preparation of Surface Treatment Compositions as a Slurry

Some of the micronized powder compositions prepared in Examples 33-35 were dispersed in water with the other components listed in Table 23 and mixed to form slurries.

TABLE 23

| Components | Example 36 (grams) | Example 37 (grams) | Example 38 (grams) |
|---|---|---|---|
| Hydromax ® 300[1] | 7.5 | 7.5 | 7.5 |
| TRITON CF-10[2] | 0.4 | 0.4 | 0.4 |
| Composition of Example 35 | 0 | 0 | 36.0 |
| Composition of Example 33 | 36.0 | 0 | 0 |
| Composition of Example 34 | 0 | 36.0 | 0 |
| Deionized water | 556.10 | 556.1 | 556.1 |
| Aluminum oxide C 18 | 3.0 | 3.0 | 3.0 |

Example 39

Preparation and Evaluation of Coated Substrates

Part A: The micronized powder treatment compositions of Examples 33-35 were applied over Standard B1000 P99X DIW unpolished item #40821 cold rolled steel panels from ACT. The panels were coated using a Nordson LAD series electrostatic spray system at 75 kV, 10 mA, 10 psi atomizing and 10 psi conveying flow air in which a brief dusting pass was conducted over the panels from front and back. Film build was obtained by baking the dust coated panels for 10 minutes at 375° F. and allowing the coated panels to cool. The dry film thickness of the coatings ranged from 0.4 mils to 0.75 mils.

The panels were then electrostatically sprayed with a powder coating composition comprising a carboxylic acid functional polyester, a triglycidyl isocyanurate cross-linker, and standard additives and fillers using a Nordson LAD series electrostatic spray system at 75 kV, 10 mA, 10 psi atomizing and 10 psi conveying flow air. The powder coating compositions were applied at a dry film thickness of 64 microns to 100 microns. The powder coatings were then cured at 375° F. for 20 minutes to form a coating layer over the treated panels.

Part B: Standard B1000 P99X DIW unpolished item #40821 cold rolled steel panels from ACT for corrosion testing, as well as ACT laser cut hot rolled steel panels for edge build testing, were dipped into solutions containing the slurries prepared in Examples 36-38. The panels were then hung and dried for 2 minutes at 110° C.

The panels were then electrostatically sprayed with a powder coating composition comprising a carboxylic acid functional polyester, a triglycidyl isocyanurate cross-linker, and standard additives and fillers using a Nordson LAD series electrostatic spray system at 75 kV, 10 mA, 10 psi atomizing and 10 psi conveying flow air. The powder coating compositions were applied at a dry film thickness of 64 microns to 100 microns. The powder coatings were cured at 325° F. for 20 minutes to form a coating layer over the treated panels.

Part C: Corrosion testing according to ASTM-B117-18 was conducted with a scribe down the middle of the test panels. The panels were exposed to 1000 hours of testing before being scraped free of loose coating and corrosion products. Scribe creep was measured as the total scribe creep based on an average of 5 readings and which was reported in millimeters.

Edge film build was also determined for the coated panels using FE-SEM analysis using a Quanta 250 FEG SEM under high vacuum and which was based on the average film build of 5 readings per panel.

The results of the testing is shown in Table 24.

TABLE 24

| Testing | Control[31] | Ex. 33 | Ex. 34 | Ex. 35 | Ex. 36 | Ex. 37 | Ex. 38 |
|---|---|---|---|---|---|---|---|
| 1000 Hours Salt Spray (mm) total Scribe | 3 | 2 | 2 | 2 | 3 | 1 | 3 |
| Average edge coverage film build um | 0 | 2.9 | 0.23 | 5.9 | 3.0 | 4.58 | 5.69 |

[31] A control panel was not treated with a first material prior to application with the same coating layer and under the same application procedures as Examples 33-38.

As shown in Table 24, the panels treated according to the present invention with micronized powders and slurries prior to application of the final powder coating layer exhibited good corrosion resistance and improved edge coverage as compared to the control panel that was not treated prior to application of the final powder coating layer.

Examples 40-42

Preparation and Application of Treatment Solutions

Treatment solutions were prepared by mixing the components listed in Table 25 at room temperature.

TABLE 25

| Components | Example 40 (grams) | Example 41 (grams) | Example 42 (grams) |
|---|---|---|---|
| Hydromax ® 300[1] | 7.5 | 7.5 | 7.5 |
| TRITON CF-10[2] | 0.4 | 0.4 | 0.4 |
| CARBODILITE E-05[17] | 30.0 | 30.0 | 30.0 |
| Deionized water | 562.1 | 549.1 | 549.1 |
| LIGOS ™ C9504 [32] | 0 | 13.0 | 0 |
| LIGOS ™ C3303 [33] | 0 | 0 | 13.0 |

[32] Styrene butadiene latex, commercially available from Trinseo.
[33] Styrene butadiene latex, commercially available from Trinseo.

Bare cold rolled steel panels, 4×12× inch available from ACT (item #10161) were dipped into the deionized water solutions containing the components listed in Table 25. The panels were then hung, dried in an oven for 3 minutes at 110° C., and allowed to cool to room temperature.

Example 43

Preparation and Evaluation of Coated Substrates

The treated panels from Examples 40-42 were electrostatically sprayed with a powder coating composition comprising a carboxylic acid functional polyester, a triglycidyl isocyanurate cross-linker, and standard additives and fillers using an Encore Nordson powder coating cup gun at 75 kV, amperage restricted at 10 mA, 10 psi atomizing and 10 psi conveying flow air. The coating thickness was between 64 µm to 90 µm. The coatings were then cured at 375° F. for 20 minutes to form coating layers.

Edge film build was also determined for the coated panels with FE-SEM analysis using a Quanta 250 FEG SEM under high vacuum and which was based on the average film build of 5 readings per panel. The results of the testing is shown in Table 26.

TABLE 26

| Test | Control[34] | Example 40 | Example 41 | Example 42 |
|---|---|---|---|---|
| Average edge coverage film build um | 0 | 3.0 | 6.6 | 3.6 |

[34]A control panel was not treated with a first material prior to application with the same coating layer and under the same application procedures as Examples 40-42.

As shown in Table 26, the panels treated according to the present invention prior to application of the final powder coating layer exhibited improved edge coverage as compared to the control panel that was not treated prior to application of the final powder coating layer. In addition, the panels coated with the compositions containing both carbodiimide and styrene butadiene latex particles demonstrated better edge coverage than the panels coated with the composition containing only carbodiimide.

Examples 44-48

Preparation and Evaluation of Multi-Layer Coated Substrates

Part A: A coating composition was first prepared from the components listed in Table 27.

TABLE 27

| Component | Example 44 (grams) | Example 45 (grams) | Example 46 (grams) | Example 47 (grams) | Example 48 (grams) |
|---|---|---|---|---|---|
| SP-6400 [35] | 66.81 | 67.74 | 68.67 | 69.13 | 69.60 |
| NPES-903 [28] | 4.29 | 4.29 | 4.29 | 4.29 | 4.29 |
| Triglycidyl isocyanurate | 5.13 | 5.20 | 5.27 | 5.30 | 5.34 |
| Crelan ® EF 403 [36] | 4.29 | 4.29 | 4.29 | 4.29 | 4.29 |
| Benzoin | 0.49 | 0.49 | 0.49 | 0.49 | 0.49 |
| Benton SD-1 [37] | 3.46 | 2.46 | 1.46 | 0.96 | 0.46 |
| PL-200[23] | 1.03 | 1.03 | 1.03 | 1.03 | 1.03 |
| Anti-crater agent[24] | 0.25 | 0.25 | 0.25 | 0.25 | 0.25 |
| $TiO_2$ | 5.22 | 5.22 | 5.22 | 5.22 | 5.22 |
| Yellow iron oxide | 8.89 | 8.89 | 8.89 | 8.89 | 8.89 |
| ACEMATT ® TS 100[38] | 0.15 | 0.15 | 0.15 | 0.15 | 0.15 |

[35] Acid functional polyester, commercially available from Sun Polymers.
[36] Cycloalipatic polyuretdione, commercially available from Covestro LLC.
[37] Organic derivative of bentonite clay, commercially available from Elementis specialties.
[38] Untreated thermal silica, commercially available from Evonic Industries.

The components listed in Table 27, except the ACEMATT® TS, were weighed in a container and mixed in a prism high speed mixer for 30 seconds at 3500 RPM to form a dry homogeneous mixture. The mixture was then melt-mixed in a Werner Pfleiderer 19 mm twin screw extruder with an aggressive screw configuration and a speed of 500 RPM. The first zone was set at 50° C., and the second, third, and fourth zones were set at 110° C. The feed rate was such that a torque of 55-65% was observed on the equipment. The mixtures were dropped onto a set of chill rolls (35° F.) to cool and re-solidify the mixtures into solid chips. The chips were weighed and the ACEMATT® TS was added before milling in a Mikro ACM®-1 Air Classifying Mill to obtain a particle size of 5 to 90 microns with a majority of the particles being from 20 to 50 microns and an average particle size of approximately 40 microns. The resulting coating compositions were solid particulate powder coating compositions that were free flowing.

Part B: Nitrogen laser cut edge steel ⅛ inch thick, iron phosphated panels were first dipped into the solution prepared in Example 40. The panels were then hung and dried for 3 minutes at 110° C. to dry and cool.

The powder coating compositions prepared in Part A were then electrostatically sprayed over the treated panels, as well as untreated panels, with a Nordson LAD series electrostatic spray system at 75 kV, amperage restricted at 10 mA, 10 psi atomizing and 10 psi conveying flow air. The coating thickness was between 19 um to 38 um. The powder coatings were tested for pill flow using the pill flow test previously described herein. The results are shown in Table 28.

Next, a topcoat formed with a powder coating composition comprising a carboxylic acid functional polyester, a triglycidyl isocyanurate cross-linker, and standard additives and fillers was applied over the first coating layers a Nordson LAD series electrostatic spray system at 75 kV, amperage restricted at 10 mA, 10 psi atomizing and 10 psi conveying flow air. The coating thickness was between Slum to 70 um. The coatings were baked at 375° F. for 20 minutes to cure both powder coatings together.

Part C: The coated panels from Part B were measured for R-value and edge film build. The R-value was determined by the R-value test, and edge film build was determined by FE-SEM analysis, which were all previously described herein. The results of the testing is shown in Table 28.

TABLE 28

| Coating | R-Value treated substrate | R-Value untreated substrate | Pill flow (mm) | Edge film build treated substrate (um) | Edge film build untreated substrate (um) |
|---|---|---|---|---|---|
| Example 44 | 2.0 | 1.9 | 15 | 18.9 | 13.5 |
| Example 45 | 2.2 | 2.4 | 20 | 9.4 | 7.6 |
| Example 46 | 2.0 | 2.1 | 30 | 8.9 | 3.5 |
| Example 47 | 2.6 | 2.6 | 35 | 4.5 | 1.7 |
| Example 48 | 3.3 | 3.0 | 56 | 5.4 | 1.6 |

As shown in Table 28, the coated substrates treated with catalyst or crosslinker exhibited good R-values and improved edge coverage as compared to the untreated coated substrates. Further, each of the first powder coating compositions exhibited good R-values and edge coverage using the first powder coating composition with low amounts of the clay rheology modifier.

Example 49

Preparation and Application of Treatment Solutions

A treatment solution was prepared by mixing the components listed in Table 29 at room temperature.

TABLE 29

| Components | Treatment Solution (grams) |
|---|---|
| Hydromax ® 300[1] | 0.625 |
| TRITON CF-10[2] | 0.033 |
| CARBODILITE E-05[17] | 2.5 |
| Deionized water | 49 |

A-412 Aluminum test panels, purchased from ACT, were first prepared by using cleaners, deoxidizing solutions, and pretreatments commercially available from PPG. Initially, the panels were cleaned with an alkaline spray cleaner Ultrax 14AWS, commercially available from PPG Industries, for 2 minutes at 100° F. After cleaning, the panels were free from water beading on the surface of the aluminum and the surface was free of oil and contaminants. The panels were then sprayed with a deoxidizing solution composed of sulfuric acid for 2 minutes at 90° F. The panels were finally sprayed with zirconium based pretreatment X-BOND® 4000 (commercially available from PPG) for 90 seconds at 90° F. The panels were rinsed with deionized water after pretreatment and dried completely with warm air.

The pretreated aluminum panels were then dipped in the treatment solution of Table 29. After dipping, the panels were air dried.

Example 50

Preparation and Evaluation of Coated Substrates

The treated panels from Example 49, as well as untreated panels, were electrostatically sprayed with a powder coating composition comprising an epoxy functional acrylic resin, a carboxylic acid functional cross-linker, and standard additives and fillers using a Nordson LAD series electrostatic sprayer. The powder coating composition was applied at a thickness of 50 microns to 125 microns. The powder coating was heated in a gas oven (made by Despatch Industries) for 20 minutes at 177° C. to form a coating layer above the surface treatments.

The 4"×12" coated substrates were cut in half and submitted to filiform testing performed under SAE J2635 (2015) "Filiform Corrosion Test Procedure for Painted Aluminum Wheels and Painted Aluminum Wheel Trim". After the filiform test, the panels' average filiform length and maximum filiform length were measured (in millimeters) along the scribe. The results of the testing is shown in Table 30.

TABLE 30

| Substrate | Average Filiform | Maximum Filiform |
|---|---|---|
| Untreated substrate | 1.4 | 2.0 |
| Substrate treated with Surface Treatment | 0.7 | 1.3 |

As shown in Table 30, the coated substrates treated with the treatment solution of the present invention exhibited better filiform corrosion resistance than the untreated coated substrates.

The present invention also relates to the following clauses.

Clause 1: A substrate comprising: (a) a first material applied to at least a portion of the substrate; and (b) a continuous film deposited from a curable powder coating composition comprising a film forming resin having functional groups, and optionally a crosslinker that is reactive with the functional groups of the film forming resin, in contact with at least a portion of the substrate to which the first material has been applied, wherein the first material is (i) a catalyst that catalyzes cure of the powder coating composition, (ii) a component reactive with the film-forming resin and/or the crosslinker of the powder coating composition, and/or (iii) a rheology modifier.

Clause 2: The substrate of clause 1, wherein an interfacial flow of the powder coating composition when liquidized and in contact with at least a portion of the substrate to which the first material has been applied is lower than an interfacial flow of the same powder composition liquidized under the same conditions that is in contact with an identical substrate with the exception that no first material has been applied.

Clause 3: The substrate of any of the preceding clauses, a viscosity of the powder coating composition when liquidized and upon and/or after contact with the first material is higher than a viscosity of the same powder coating composition liquidized under the same conditions that is in contact with an identical substrate with the exception that no first material has been applied.

Clause 4: The substrate of any of the preceding clauses, wherein the first material is localized at the interface where the powder coating composition comes into contact with the first material.

Clause 5: The substrate of any of clauses 1 to 3, wherein the first material migrates into at least a portion of the powder coating composition.

Clause 6: The substrate of any of the preceding clauses, wherein the first material is the catalyst that catalyzes cure of the powder coating composition.

Clause 7: The substrate of any of the preceding clauses, wherein the first material is the component reactive with the film-forming resin and/or the crosslinker of the powder coating composition.

Clause 8: The substrate of clause 7, wherein the first material comprises a crosslinker, a resin, a reactive diluent, a monomer, or a combination thereof that is reactive with the film-forming resin and/or the crosslinker of the powder coating composition.

Clause 9: The substrate of clause 8, wherein the first material comprises a polycarbodiimide crosslinker, Clause 10: The substrate of any of the preceding clauses, wherein the first material is the rheology modifier.

Clause 11: The substrate of clause 10, wherein the rheology modifier comprises silica, chemically modified silica, alumina, chemically modified alumina, a hydrophobically modified ethylene-oxide polymer, a rubber latex, or any combination thereof.

Clause 12: The substrate of any of the preceding clauses, wherein the first material prior to application is dispersed or dissolved in a liquid medium.

Clause 13: The substrate of clause 12, wherein the liquid medium is an aqueous liquid medium.

Clause 14: The substrate of any of the preceding clauses, wherein the first material is applied directly over at least a portion of the substrate.

Clause 15: The substrate of any of the preceding clauses, wherein the first material is included in a pretreatment composition applied to at least a portion of the substrate.

Clause 16: The substrate of clause 15, wherein there is a greater concentration of the first material in a surface region of the pretreatment composition applied to at least a portion of the substrate than a bulk region of the pretreatment composition applied to at least a portion of the substrate.

Clause 17: The substrate of any of clauses 1-13, wherein the substrate further comprises a pretreatment layer and the first material is applied over at a least portion of the pretreatment layer.

Clause 18: The substrate of claim 1-13, wherein the substrate further comprises a coating layer and the first material is applied over at a least portion of the coating layer.

Clause 19: The substrate of any of the preceding clauses, wherein after application to the substrate, at least a portion of the powder coating composition has a pill flow rate of greater than 30 mm as measured by the pill flow test.

Clause 20: The substrate of any of the preceding clauses, wherein the powder coating composition is physisorbed onto the substrate.

Clause 21: The substrate of any of the preceding clauses, wherein the first material is physisorbed on the substrate.

Clause 22: The substrate of any of the preceding clauses, wherein the first material is chemisorbed on the substrate.

Clause 23: The substrate of any of the preceding clauses, further comprising a second coating composition applied over at least a portion of a coating formed from the powder coating composition of (b).

Clause 24: The substrate of clause 23, wherein the second coating composition is a powder coating composition, and wherein the first powder coating composition, the second powder coating composition, or both have a pill flow rate of greater than 40 as determined by the pill flow test.

Clause 25: The substrate of any of the preceding clauses, wherein the substrate is a metal.

Clause 26: The substrate of any of clauses 1-24, wherein the substrate comprises cold rolled steel, hot rolled steel, steel coated with zinc metal, zinc compounds, zinc alloys, electrogalvanized steel, hot-dipped galvanized steel, galvanealed steel, steel plated with zinc alloy, stainless steel, zinc-aluminum-magnesium alloy coated steel, aluminum, aluminum alloys, aluminum plated steel, aluminum alloy plated steel, magnesium, magnesium alloys, nickel, brass, copper, silver, gold, plastic, or any combination thereof.

Clause 27: The substrate of any of the preceding clauses, wherein the substrate is a fastener, coiled metal, a vehicle, a package, a heat exchanger, a vent, an extrusion, roofing, flooring, a wheel, a grate, a belt, a conveyor, an aircraft, an aircraft component, a vessel, a marine component, a vehicle, a building, an electrical component, a grain or seed silo, wire mesh, a screen or grid, HVAC equipment, a frame, a tank, a cord, a wire, or any combination thereof.

Clause 28: A method for treating a substrate: (a) contacting at least a portion of the substrate with a first material; (b) directly contacting at least a portion of the substrate in contact with the first material with a powder coating composition comprising a film forming resin having functional groups and optionally a crosslinker that is reactive with the functional groups of the film forming resin, and (c) liquidizing the powder coating composition to form a continuous film of the powder coating composition on the substrate, wherein the first material is (i) a catalyst that catalyzes cure of the powder coating composition, (ii) a component reactive with the film-forming resin and/or the crosslinker of the powder coating composition, and/or (iii) a rheology modifier.

Clause 29: The method of clause 28, wherein step (a) comprises dipping the substrate in a bath that comprises the first material.

Clause 30: The method of clause 29, wherein the bath comprises a pretreatment bath.

Clause 31: The method of clause 30, wherein the pretreatment bath is a cleaner bath, a deoxidizer bath, a cleaner-coater bath, a rinse conditioner bath, a pretreatment coating bath, a rinsing bath, a sealing bath, or a deionized water rinsing bath.

Clause 32: The method of clause 28, wherein the first material is contained on and/or in a wipe and step (a) comprises wiping the substrate.

Clause 33: The method of clause 28, wherein the first material is contained in a liquid formulation and the liquid formulation is sprayed onto the substrate in step (a).

Clause 34: The method of clause 33, wherein the liquid formulation further comprises a surfactant.

Clause 35: The method of clause 28, wherein the first material is deposited onto the substrate by electrodeposition or vapor deposition in step (a).

Clause 36: The method of clause 28, wherein the first material is bushed or rolled onto the substrate in step (a).

Clause 37: The method of clause 28, wherein the first material is a solid and is blasted onto the substrate in step (a) or is sprayed onto the substrate in step (a) as a powder.

Clause 38: The method of clause 28, wherein the substrate is cleaned and coated with the first material in a single step.

Clause 39: The method of clause 28, wherein the substrate is plated with a metal prior to step (a).

Clause 40: The method of clause 28, wherein the substrate comprises an anodized, cast, or forged metal.

Clause 41: The method of any of the clauses 28-40, wherein first material is applied directly to the substrate.

Clause 42: The method of any of clauses 28-40, wherein the substrate is treated prior to step (a).

Clause 43: The method of clause 42, wherein, prior to step (a), the substrate is alkaline cleaned, deoxidized, mechanically cleaned, ultrasonically cleaned, plasma cleaned or etched, exposed to chemical vapor deposition, treated with an adhesion promoter, or any combination thereof.

Clause 44: The method of clause 42, wherein the substrate is pretreated prior to step (a) with a pretreatment composition.

Clause 45: The method of clause 44, wherein the pretreatment composition comprises a sol-gel, iron phosphate, manganese phosphate, zinc phosphate, a rare earth metal, permanganate, zirconium, titanium, a silane, trivalent chrome (TCP), chromate, metal oxide, hydrotalcite, phosphonic acid, layered double hydroxide, or any combination thereof.

Clause 46: The method of clauses 44 or 45, wherein, after pretreatment, the substrate is rinsed with, sprayed with, or wiped with a solution that comprises the first material in step (a).

Clause 47: The method of any of clauses 44-46, wherein the pretreatment composition is dried after application.

Clause 48: The method of any of clauses 28 to 47, further comprising step (c), contacting at least a portion of the substrate with a second coating composition.

Clause 49: The method of any of the clauses 28 to 48, wherein the first material is dried by air and/or heat after step (a).

Clause 50: The method of any of clauses 28-49, wherein there is no intervening step between step (a) and step (b).

Clause 51: The method of any of clauses 28-50, wherein the dry film thickness of the coating formed from the powder coating composition at the edge of the substrate is 2 µm or greater.

Clause 52: A method for treating a coil comprising: (a) contacting at least a portion of the coil with a first material; (b) rolling the coil; (c) unrolling the coil; (d) directly contacting at least a portion of the coil in contact with the first material with a powder coating composition comprising a film forming resin having functional groups and a crosslinker that is reactive with the functional groups of the film forming resin, and (e) liquidizing the powder coating composition to form a continuous film of the powder coating composition on the coil, wherein the first material is (i) a catalyst that catalyzes cure of the powder coating composition, (ii) a component reactive with a film-forming resin and/or a crosslinker of the powder coating composition, and/or (iii) a rheology modifier.

Whereas particular embodiments of this invention have been described above for purposes of illustration, it will be evident to those skilled in the art that numerous variations of the details of the present invention may be made without departing from the invention as defined in the appended claims.

The invention claimed is:

1. A method for improving edge coverage of a powder coating composition on a substrate comprising:
   a. contacting at least a portion of a substrate with a first material that is: (i) a catalyst selected from at least one of a phosphonium compound, a quaternary ammonium halide compound, an amine compound, an imidazole compound, a sulfonium compound, and a compound comprising a transition metal and/or post-transition metal, that catalyzes cure of the powder coating composition, (ii) a component reactive with a film-forming resin and/or a crosslinker of the powder coating composition, the component selected from at least one of: an oxazoline-functional crosslinker; a polycarbodiimide functional crosslinker; an epoxy-functional crosslinker; a reactive diluent; and a monomer; and/or (iii) a rheology modifier comprising at least one of, colloidal silica, alumina, chemically modified alumina, and a rubber latex;
   b. directly contacting at least a portion of first material on the substrate with the powder coating composition, wherein the powder coating composition comprises a film forming resin and a crosslinker that is reactive with the film forming resin, wherein the film forming resin comprises carboxylic acid or epoxide functional groups and the crosslinker comprises a phenolic resin, an epoxy resin, triglycidyl isocyanurate, a beta-hydroxy (alkyl) amide, a polyacid, an anhydride, an organometallic acid-functional material, a carbodiimide, and/or an oxazoline; and
   c. liquidizing the powder coating composition to form a coating layer of the powder coating composition on the substrate, wherein a ratio of dry film thickness of the coating layer formed from the powder coating composition at an edge of the substrate and at 10 mm away from the edge into the center is from 1:3 to 1:15.

2. The method of claim 1, wherein an interfacial flow of the powder coating composition when liquidized and in contact with at least a portion of the first material on the substrate is lower than an interfacial flow of the same powder composition liquidized under the same conditions that is in contact with an identical substrate with the exception that no first material has been applied.

3. The method of claim 1, wherein a viscosity of the powder coating composition when liquidized and upon and/or after contact with the first material is higher than a viscosity of the same powder coating composition liquidized under the same conditions that is in contact with an identical substrate with the exception that no first material has been applied.

4. The method of claim 1, wherein step (a) comprises dipping the substrate in a bath that comprises the first material.

5. The method of claim 4, wherein the bath comprises a pretreatment bath.

6. The method of claim 5, wherein the pretreatment bath is a cleaner bath, a deoxidizer bath, a cleaner-coater bath, a rinse conditioner bath, a pretreatment coating bath, a rinsing bath, a sealing bath, or a deionized water rinsing bath.

7. The method of claim 1, wherein the first material is contained on and/or in a wipe and step (a) comprises wiping the substrate with the wipe.

8. The method of claim 1, wherein the first material is contained in a liquid formulation and the liquid formulation is sprayed onto the substrate in step (a).

9. The method of claim 8, wherein the liquid formulation further comprises a surfactant.

10. The method of claim 1, wherein the first material is deposited onto the substrate by electrodeposition or vapor deposition in step (a).

11. The method of claim 1, wherein the first material is brushed or rolled onto the substrate in step (a).

12. The method of claim 1, wherein the first material is a solid and is blasted onto the substrate in step (a) or is sprayed onto the substrate in step (a) as a powder.

13. The method of claim 1, wherein the substrate is cleaned and coated with the first material in a single step.

14. The method of claim 1, wherein the substrate is plated with a metal prior to step (a).

15. The method of claim 1, wherein the substrate comprises an anodized, cast, or forged metal.

16. The method of claim 1, wherein the substrate is treated prior to step (a).

17. The method of claim 16, wherein, prior to step (a), the substrate is alkaline cleaned, deoxidized, mechanically cleaned, ultrasonically cleaned, plasma cleaned or etched, exposed to chemical vapor deposition, treated with an adhesion promoter, or any combination thereof.

18. The method of claim 1, wherein the substrate is pretreated prior to step (a) with a pretreatment composition.

19. The method of claim 18, wherein the pretreatment composition comprises a sol-gel, iron phosphate, manganese phosphate, zinc phosphate, a rare earth metal, permanganate, zirconium, titanium, a silane, trivalent chrome, chromate, a silicate, molybdenum, a lanthanide, a metal chelate, a metal oxide, hydrotalcite, phosphonic acid, layered double hydroxide, or any combination thereof.

20. The method of claim 18, wherein, after pretreatment, the substrate is rinsed with, sprayed with, or wiped with a solution that comprises the first material in step (a).

21. The method of claim 18, wherein the pretreatment composition is dried after application.

22. The method of claim 1, further comprising step (d), contacting at least a portion of the substrate with a second coating composition.

23. The method of claim 1, wherein the first material is dried by air and/or heat after step (a).

24. The method of claim 1, wherein there is no intervening step between step (a) and step (b).

25. The method of claim 1, wherein first material is applied directly to the substrate.

26. The method of claim 1, wherein the powder coating composition, upon cure, has an R-value of 75% or greater as compared to an R-value of a coating formed from the powder coating composition applied over a substrate that is free of the first material, where R-value is measured by the R-value test.

27. The method of claim 1, wherein the dry film thickness of the coating formed from the powder coating composition at the edge of the substrate is 2 μm or greater.

28. The method of claim 1, wherein the coated substrate has 10% or less linear edge corrosion after 40 cycles as measured by the linear edge corrosion test.

29. A method for improving edge coverage of a powder coating composition on a coil metal substrate comprising:
   contacting at least a portion of the metal substrate with a first material that is: (i) a catalyst selected from at least one of a phosphonium compound, a quaternary ammonium halide compound, an amine compound, an imidazole compound, a sulfonium compound, and a compound comprising a transition metal and/or post-transition metal, that catalyzes cure of the powder coating composition, (ii) a component reactive with a film-forming resin and/or a crosslinker of the powder coating composition, the component selected from at least one of: an oxazoline-functional crosslinker; a polycarbodiimide functional crosslinker; an epoxy-functional crosslinker; a reactive diluent; and a monomer; and/or (iii) a rheology modifier comprising at least one of, colloidal silica, alumina, chemically modified alumina, and a rubber latex;

rolling the metal substrate into a coil;

unrolling the coil;

directly contacting at least a portion of the first material on the metal substrate with the powder coating composition, wherein the powder coating composition comprises a film forming resin and a crosslinker that is reactive with the film forming resin, wherein the film forming resin comprises carboxylic acid or epoxide functional groups and the crosslinker comprises a phenolic resin, an epoxy resin, triglycidyl isocyanurate, a beta-hydroxy (alkyl) amide, a polyacid, an anhydride, an organometallic acid-functional material, a carbodiimide, and/or an oxazoline; and liquidizing the powder coating composition to form a coating layer of the powder coating composition on the metal substrate, wherein a ratio of dry film thickness of the coating layer formed from the powder coating composition at an edge of the substrate and at 10 mm away from the edge into the center is from 1:3 to 1:15.

\* \* \* \* \*